(12) United States Patent
Ma et al.

(10) Patent No.: US 9,151,891 B2
(45) Date of Patent: Oct. 6, 2015

(54) METAMATERIAL-BASED OPTICAL LENSES

(75) Inventors: Changbao Ma, Fairfax, VA (US);
Zhaowei Liu, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 256 days.

(21) Appl. No.: 13/578,665

(22) PCT Filed: Feb. 14, 2011

(86) PCT No.: PCT/US2011/000268
§ 371 (c)(1),
(2), (4) Date: Sep. 13, 2012

(87) PCT Pub. No.: WO2011/100070
PCT Pub. Date: Aug. 18, 2011

(65) Prior Publication Data
US 2012/0328240 A1 Dec. 27, 2012

Related U.S. Application Data

(60) Provisional application No. 61/304,350, filed on Feb. 12, 2010.

(51) Int. Cl.
*G02B 6/32* (2006.01)
*G02B 6/122* (2006.01)
*B82Y 20/00* (2011.01)
(Continued)

(52) U.S. Cl.
CPC .............. *G02B 6/1226* (2013.01); *B82Y 20/00* (2013.01); *G02B 1/002* (2013.01); *G02B 6/107* (2013.01); *H01Q 15/0086* (2013.01); *H01Q 15/02* (2013.01); *G02F 2203/10* (2013.01)

(58) Field of Classification Search
CPC .................................... G02B 6/32; G02B 6/00
USPC ....................................................... 385/33, 8
See application file for complete search history.

(56) References Cited

U.S. PATENT DOCUMENTS 6,951,715 B2 * 10/2005 Cunningham et al. ............ 435/4
7,623,745 B2 * 11/2009 Podolskiy et al. .............. 385/43
(Continued)

OTHER PUBLICATIONS

Fang, et al., "Sub-Diffraction-Limited Optical Imaging with a Silver Superlens," Science, 308:534-537, 2005.
(Continued)

*Primary Examiner* — Kaveh Kianni
(74) *Attorney, Agent, or Firm* — Perkins Coie LLP

(57) ABSTRACT

Devices based on metamaterial structures to guide and manipulate light, other electromagnetic radiation and acoustic waves. For example, a lens can include a metamaterial structure comprising nano structures of metallic and dielectric materials; and a plasmonic waveguide coupler formed over the metamaterial structure for coupling electromagnetic radiation to or from metamaterial structure. The metamaterial structure has an anisotropic structure and the plasmonic waveguide coupler is structured to include metal and non-metal parts to support surface plasmon polaritons and to cause different phase delays at different locations of an interface with the metamaterial structure in a way that the metamaterial structure and the plasmonic waveguide coupler effect a lens for performing a Fourier transform of the electromagnetic radiation coupled between the metamaterial structure and the plasmonic waveguide coupler.

19 Claims, 29 Drawing Sheets

(51) Int. Cl.
*G02B 1/00* (2006.01)
*G02B 6/10* (2006.01)
*H01Q 15/02* (2006.01)
*H01Q 15/00* (2006.01)

(56) References Cited

U.S. PATENT DOCUMENTS

| | | | |
|---|---|---|---|
| 7,649,180 B2 | 1/2010 | Hyde et al. | |
| 8,492,315 B2 * | 7/2013 | Flemming et al. | 506/32 |
| 8,599,489 B2 * | 12/2013 | Shalaev et al. | 359/665 |
| 2003/0099422 A1 * | 5/2003 | Beom et al. | 385/12 |
| 2004/0132172 A1 * | 7/2004 | Cunningham et al. | 435/287.2 |
| 2004/0151626 A1 * | 8/2004 | Cunningham et al. | 422/58 |
| 2009/0069193 A1 * | 3/2009 | Flemming et al. | 506/9 |
| 2009/0219623 A1 | 9/2009 | Shalaev et al. | |
| 2010/0111475 A1 | 5/2010 | Lu et al. | |
| 2010/0134898 A1 * | 6/2010 | Shalaev et al. | 359/665 |
| 2011/0201132 A1 * | 8/2011 | Cunningham et al. | 436/518 |
| 2013/0065777 A1 * | 3/2013 | Altug et al. | 506/9 |

OTHER PUBLICATIONS

Jacob et al., "Optical Hyperlens: Far-Field Imaging beyond the Diffraction Limit," Optics Express, 14(18):8247-8256, 2006.
Liu et al., "Far-Field Optical Superlens," Nano Letters, 7(2):403-408, 2007.
Liu et al., "Far-Field Optical Hyperlens Magnifying Sub-Diffraction-Limited Objects," Science, 315:1686, 2007.
Pendry, J.B, "Negative Refraction Makes a Perfect Lens," Physical Review Letters, 85(18):3966-3969, 2000.
Salandrino, et al., "Far-Field Subdiffraction Optical Microscopy using Metamaterial Crystals: Theory and Simulations," Physical Review, B 74:075103-1 to 075103-5, 2005.
Smolyaninov, et al., "Magnifying Superlens in the Visible Frequency Range," Science, 315:1699-1701, 2007.
Taubner, et al., "Near-Field Microscopy Through a SiC Superlens," Science, 313:1595, 2006.
Vedantam, et al., "A Plasmonic Dimple Lens for Nanoscale Focusing of Light," Nano Letters, 9(10):3447-3452, 2009.

\* cited by examiner

Hyperbolic dispersion

Elliptic dispersion

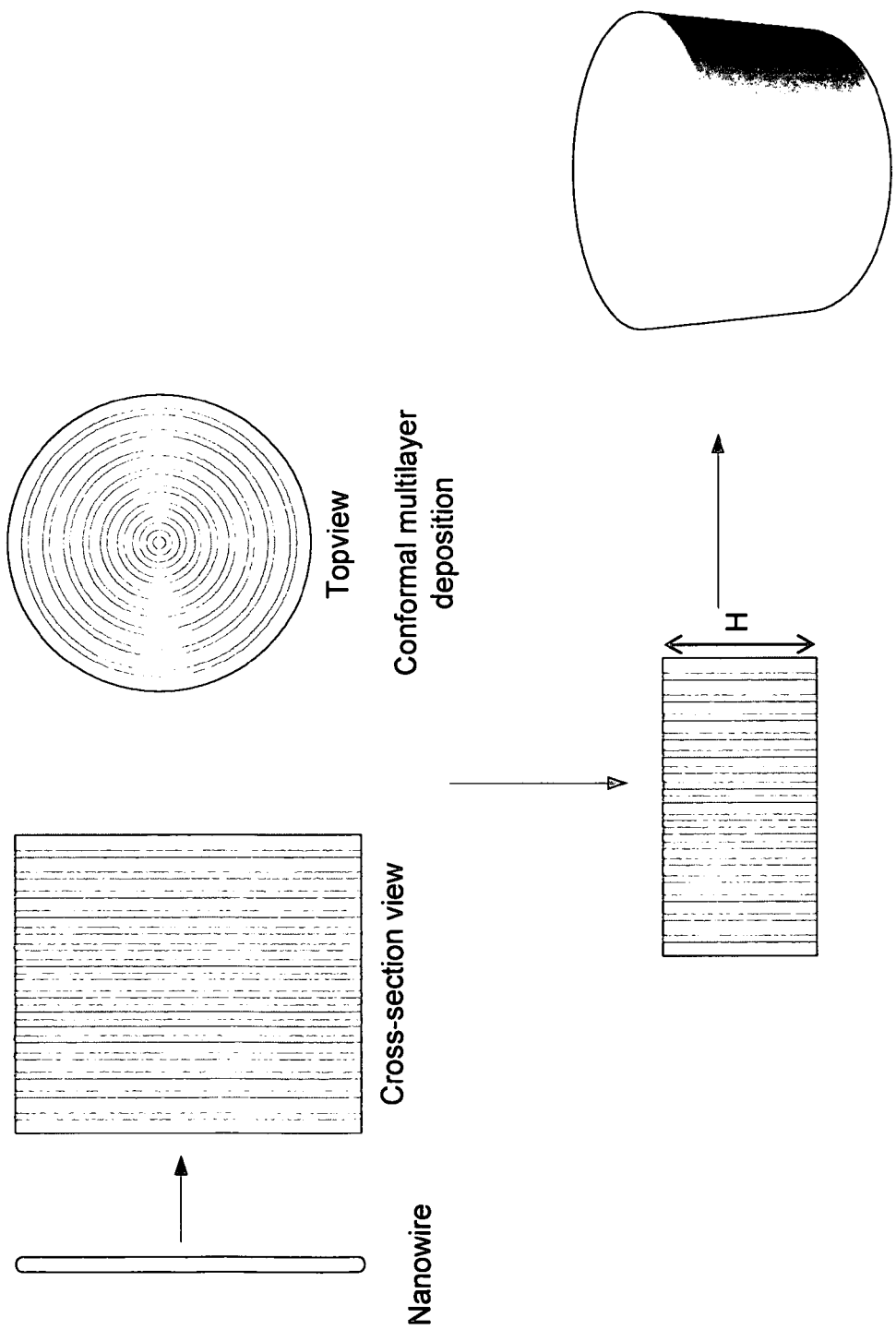

METAMATERIAL-BASED OPTICAL LENSES

PRIORITY CLAIM AND RELATED APPLICATION

This patent document claims the priority of U.S. Provisional Application No. 61/304,350, filed Feb. 12, 2010, entitled "METAMATERIAL-BASED OPTICAL LENSES", which is incorporated by reference in its entirety as part of the disclosure of this document.

BACKGROUND

This patent document relates to optical devices that guide and manipulate light.

An optical lens is a fundamental optical component or device of various optical devices for guiding and/or manipulating light. Optical lenses can be made of optical dielectric materials shaped to have one or more contiguously smooth concave or convex shapes that use concave or convex surfaces to guide or manipulate light by optical refraction. Such lenses can be designed to control light with high precision and can be configured as, for example, high quality imaging lenses used in optical imaging capturing devices (e.g., cameras) and image display systems (e.g., projectors). An optical lens can also be made of a dielectric material shaped to have a set of discrete, concentric annular rings known as Fresnel zones to achieve large optical apertures.

Optical lenses based on the above designs tend to be limited in various aspects due to certain characteristics of natural or synthetic optical dielectric materials such as limited upper values and the positive sign of refractive indices, or other requirements of certain applications such as requirements on the physical size or weight of optical devices.

SUMMARY

This patent document describes devices based on metamaterial structures to guide and manipulate light, other electromagnetic radiation and acoustic waves. The use of metamaterial structures allows engineering certain properties of optical, electromagnetic and acoustic lenses beyond the technical features that can be achieved based on natural or synthetic optical dielectric materials and other materials.

In one implementation, a lens can include a metamaterial structure comprising nano structures of metallic and dielectric materials; and a plasmonic waveguide coupler formed over the metamaterial structure for coupling electromagnetic radiation to or from metamaterial structure. The metamaterial structure has an anisotropic structure and the plasmonic waveguide coupler is structured to include metal and nonmetal parts to support surface plasmon polaritons and to cause different phase delays at different locations of an interface with the metamaterial structure in a way that the metamaterial structure and the plasmonic waveguide coupler effect a lens for performing a Fourier transform of the electromagnetic radiation coupled between the metamaterial structure and the plasmonic waveguide coupler. The electromagnetic radiation can be, for example, outside an optical spectrum (e.g., in an RF or microwave spectral range) and the metamaterial structure and the plasmonic waveguide coupler are structured to interact with the radiation outside the optical spectrum.

In another implementation, an optical lens based on an optical metamaterial structure includes an optical metamaterial structure comprising nano structures of metallic and dielectric materials; and a plasmonic waveguide coupler formed over the optical metamaterial structure, wherein the optical metamaterial structure and plasmonic waveguide coupler are structured to effect an optical lens for performing a Fourier transform in optical imaging.

In yet another implementation, an optical lens based on an optical metamaterial structure includes an optical metamaterial structure comprising nano structures of metallic and dielectric materials and structured to include a slab portion and a curved portion connected to the slab portion, the curved portion including a curved surface to effectuate an optical lens with a focus point within the optical metamaterial structure.

These and other implementations are described in greater detail in the drawings, the description and the claims.

BRIEF DESCRIPTION OF DRAWINGS

FIGS. 26-32 illustrate examples of some fabrication methods and/or processes for fabricating the described metamaterial-based lenses

DETAILED DESCRIPTION

Figure 1A:
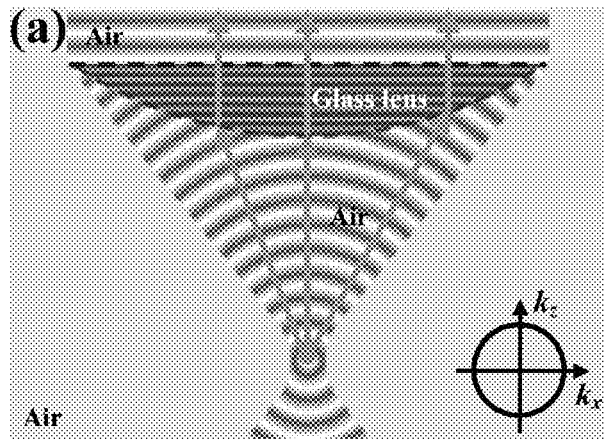
FIG. 1 illustrates examples of geometries and operations of different optical lenses. (a) a conventional glass lens that focuses light by refraction with curved interfaces, (b) a Fresnel zone plate that focuses light by diffraction and interference with alternate opaque and transparent zones, and (c) a metalens that includes a mematerial slab that can support high k-vector propagation and a plasmonic waveguide coupler (PWC) atop.

This patent document describes devices based on metamaterial structures to guide and manipulate light, other electromagnetic radiation and acoustic waves. The use of metamaterial structures allows engineering certain properties of optical, electromagnetic and acoustic lenses beyond the technical features that can be achieved based on natural or synthetic optical dielectric materials and other materials. Specific examples below are for optical lenses to illustrate various technical features and can be applied to devices for other electromagnetic radiation and acoustic waves.

Many optical devices such as lenses and waveguides are made of natural and artificial or synthetic optical materials that are non-conducting dielectric materials. Such materials have positive refractive indices and the electric field vector E, the magnetic field vector H and the pointing vector k of the electro-magnetic wave form a right-handed system. It is well known that the resolution of such focusing elements is fundamentally limited by the diffraction of light so that two objects cannot be optically distinguished if they are closer than $\lambda/(2NA)$ from each other, where $\lambda$ is the working wavelength of light and NA is the numerical aperture of the objective of the microscope. In addition, dielectric optical materials tend to have limited upper values for the refractive indices and this limit restricts the optical performance of such lenses.

Optical metamaterial structures can be used to design an optical medium that deviates from characteristics of a conventional optical medium to achieve certain technical advantages or to meet certain application requirements.

Optical metamaterials are artificially engineered nanocomposites that can provide extraordinary optical material properties beyond the natural materials and most artificial optical dielectric materials. Optical metamaterials can be used to construct novel optical devices. Examples of optical metamaterials include, but are not limited to, engineered nanocomposites structures that exhibit the applanate anisotropic elliptic dispersive property ($\in_{xy}'>0$, $\in_z'>0$) or hyperbolic dispersive property ($\in_{xy}'>0$, $\in_z'<0$). For example, an optical metamaterial structure suitable for implementing the techniques described in this document can include nano structures of metallic and dielectric materials that form optically anisotropic structures, such as a multilayer composite of metallic and dielectric layers, a structure having metallic nanowires and a dielectric template in which the metallic nanowires are embedded, a structure having pairs of metallic nanorods and a dielectric template in which the pairs of metallic nanorods are embedded, and a structure having metallic layers where each metal layer is patterned to include voids. Some specific examples of optical metamaterials are described in V. Shalaev, "Optical negative-index metamaterials" in Nature Photonics 1, 41 (2007), S. A. Ramakrishna et al., "Imaging the near field" in J. Mod. Opt. 50, 1419 (2003), and J. Pendry et al., "Low frequency plasmons in thin-wire structures" in Journal of Physics-Condensed Matter 10, 4785 (1998), which are incorporated by reference as part of the disclosure of this document.

Optical devices and techniques described in this document are based on optical metamaterials.

In one example, an optical lens based on a metamaterial structure can be configured as a "metalens" which includes a metamaterial slab that can support the propagation of waves with high wavevectors and a nonperiodic plasmonic waveguide coupler atop that can provide phase compensation and wavevector matching. This metalens can achieve super resolution focusing and exhibit the phase compensation properties of a conventional optical lens, such as Fourier transform and imaging. The novel lensing characteristics of the metalens can provide new opportunities for optical system design and information processing. In another example, metamaterial immersion lenses can be constructed by shaping plasmonic metamaterials. The convex and concave shapes for the elliptically and hyperbolically dispersive metamaterials are designed using phase compensation methods. Numerical simulations verify that the metamaterial immersion lenses possess exceptionally large effective numerical apertures and thus can achieve deep subwavelength resolution focusing.

For example, an optical lens based on an optical metamaterial structure, a "metalens", can include an optical metamaterial structure having nano structures of metallic and dielectric materials, and a plasmonic waveguide coupler formed over the optical metamaterial structure to coupling light based on plasmonic waves. The optical metamaterial structure and plasmonic waveguide coupler are structured to effect an optical lens for performing a Fourier transform in optical imaging.

Figure 1B:
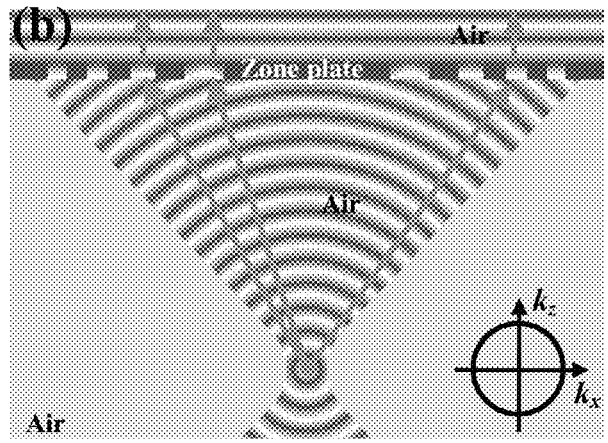
Figure 1C:
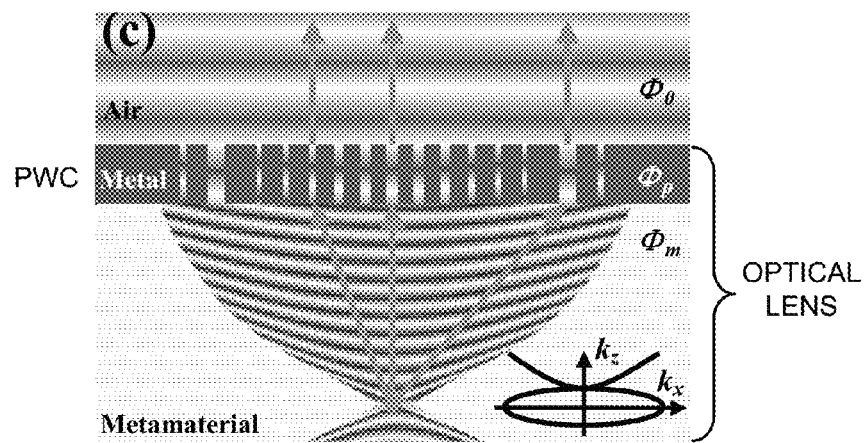

FIG. 1 illustrates examples of geometries and operations of different optical lenses. (a) a conventional glass lens that focuses light by refraction with curved interfaces, (b) a Fresnel zone plate that focuses light by diffraction and interference with alternate opaque and transparent zones, and (c) a metalens that includes a memataerial slab that can support high k-vector propagation and a plasmonic waveguide coupler (PWC) atop. The equi-frequency curve (EFC) is shown in the inset at the lower right corner of each figure. The EFC curves for the conventional lens and Fresnel zone plate are a circle and the radius is limited by the surrounding material. Through various geometrical designs, the PWC can convert a wave with specific wavefront into a plane wave. Because light is reciprocal, a plane wave thus can be focused into a spot with resolution only limited by the metamaterials. The inset in FIG. 1(c) shows two examples of the EFC for anisotropic metamaterials that support super resolution.

An optical lens is a fundamental element in optics. A glass lens, for example, refracts and focuses light relying on the curved interface. As is illustrated two-dimensionally (2D) using a plano-convex lens in FIG. 1(a), when the cylindrical wave from a line source at the focal point of the lens hits the lens, it is refracted by the curved interface and its phase is compensated by the various thicknesses at different locations so that it is converted to a plane wave. This conversion can also be achieved using a zone plate by allowing only the in-phase light zones to pass and interfere, as shown in FIG. 1(b). Due to the reciprocity of the light, a plane wave thus can be focused to a spot by such a glass lens or a zone plate. However, their spatial resolution has long been believed to be limited to approximately half of the working wavelength. Although the resolution can be improved by liquid or solid immersion techniques, the achievable enhancement may be limited by the refractive index of naturally available optical materials or synthetic optical materials. From the point of view of Fourier optics, such lateral resolution limit originates from the limited transverse wavevector (k-vector) of the propagating waves in the materials. Recently, various superlenses have emerged with resolving power beyond the diffraction limit. However, such superlenses cannot bring a plane wave into a focus due to the lack of phase compensation mechanism, which is one of the basic functions of a conventional lens. Metalens structures described in this document can be implemented in ways that achieve super resolution focusing through phase compensation while processing the basic properties of a conventional optical lens, such as Fourier transform and imaging.

In order to achieve higher resolution, a material that can support the propagation of light with higher transverse k-vectors is needed. Metamaterials are artificially engineered nanocomposites that can provide extraordinary material properties beyond the availabilities of natural or synthetic optical dielectric materials. Light with high k-vectors inside a metamaterial cannot transmit to air due to total internal reflection. A bidirectional coupling mechanism is provided to convert waves from high k-vectors in the metamaterial to low k-vectors in air and vice versa. In the examples described in this document, a planar plasmonic metal-insulator-metal (MIM) waveguide coupler is provided to provide the above dual-direction coupling of light. As a result, we propose a "metalens" concept by combining a metamaterial slab and a plasmonic waveguide coupler (PWC) as shown in FIG. 1(c). Such a metalens can achieve both super resolution supported by the metamaterials and phase compensation through the PWC, and thus bridge up the k-vector mismatch between the metamaterial and the free space. The metalens therefore can directly project magnified super resolution images to the far field and more importantly has many of a conventional optical glass lens's basic functions, such as Fourier transform (i.e., plane wave focusing).

FIG. 1(c) shows a representative schematic geometry of the metalens. The metamaterial in this metalens is configured to support the propagation of waves with high k-vectors. For example, the applanate anisotropic elliptic ($\epsilon_{xy}'>0, \epsilon_z'>0$) or hyperbolic ($\epsilon_{xy}'>0, \epsilon_z'<0$) dispersive metamaterials with representative equi-frequency contour (EFC, $k_x^2/\epsilon_z + k_z^2/\epsilon_x = k_0^2$) shown in the inset of FIG. 1(c). It is represented in 2D for simplicity. $k_0$ is the free space wavevector, e's are the complex permittivity in their corresponding direction, and the prime denotes the real part. The material properties required for metalens analyzed above can be obtained using various structures, including, for example, multilayer and nanowire metamaterials. The metamaterial property may be tuned by both the permittivity and the permeability. The examples in this document are limited metamaterials that are designable in permittivity only and such designs may be used to reduce optical loss.

The plasmonic waveguide coupler (PWC) in FIG. 1(c) can be made based on various structures. For example, a metallic layer that is patterned to include arrayed nano-slits with variant widths can be used as a PWC to transport electro-magnetic energy (e.g., light) in form of surface plasmon polaritons via the nano-slits from one side of the metal layer to the other side and the phase delays are controlled by the variant widths. The metallic layer can be optically thick that would not transmit light in absence of the nano slits or channels. For another example, a PWC can be formed by two-dimensional metal-insulator-metal slot waveguide structures (e.g., Ag/SiO2/Ag structures) with varying waveguide thicknesses to guide the light between the two metal layers. Some specific examples are described in H. Shi et al., "Beam manipulating by metallic nano-slits with variant widths" in Optics Express 13, 6815 (2005), J. Dionne et al., "Plasmon slot waveguides: Towards chip-scale propagation with subwavelength-scale localization" in Physical Review B 73, 35407 (2006), L. Verslegers et al., "Planar Lenses Based on Nanoscale Slit Arrays in a Metallic Film" in Nano Letters 9, 235 (2008), and Z. Sun, and H. K. Kim, "Refractive transmission of light and beam shaping with metallic nano-optic lenses" in Applied Physics Letters 85, 642 (2004), which are incorporated by reference as part of the disclosure of this document.

In order to make a focusing lens using the metamaterial slab with the required properties above, a phase compensation mechanism is needed. Due to the surface plasmonic waveguiding effect in metal-insulator-metal (MIM) waveguide, a large range of propagation constants can be obtained, so a nonperiodically distributed MIM array is suitable to tailor the phase of the light. This non-periodic structure of the PWC is designed to provide the desired optical coupling and desired magnification and phase compensations.

FIG. 1(c) shows the 2D metalens and its phase compensation diagram. The light from a line object inside the anisotropic metamaterial propagates with a specific wavefront that is determined by the metamaterial properties. Waves spread out in space and are incident upon the MIM waveguides, with various lateral k-vectors and initial phases at different locations. All the waves that hit on the waveguides can excite the waveguide mode. The waveguides therefore need to be designed differently in terms of propagating constant, so that a non-flat wavefront underneath the waveguide layer can be transformed to a flat one atop, and vice versa. More specifically, in FIG. 1(c), the propagating light from the line source in the metamaterial slab forms, for example, a concave wavefront due to the hyperbolic dispersion of the metamaterial and results in different phases at the lower entrance of each waveguide. Accordingly, the waveguides at different places need to introduce different phase delay so that the same phase is obtained at the outlet of the wave guides. As each waveguide and the spacing are in nanoscale, the top surface of the PWC can be regarded as a collection of point sources with the same phases. Based on the Huygens principle, a plane wave forms and continues to propagate in the free space above the PWC. Because this principle is reciprocal, when a plane wave is incident on the metalens from the top, a deep subwavelength focus can be formed in the metamaterial through constructive interference. In this specific example, the phase condition to form a focus by a metalens is $$\Phi_m + \Phi_p = \Phi_{const} + 2l\pi \qquad (1)$$

with $\Phi_m = [\epsilon_x' z^2 + \epsilon_z' x^2]^{1/2}$ being the phase change in the metamaterial slab, $\Phi_p$ being the phase change introduced by wave propagation in each waveguide, assuming there is no coupling between waveguides, $\Phi_{const}$ being a constant and l being an integer. The plasmonic MIM waveguide can be accordingly designed to have a different propagation constant $\beta = \beta(\epsilon_m, \epsilon_d, w)$ in a wide range, thus providing the necessary phase compensation $\Phi_p \sim Re(\beta h)$. Here $\epsilon_m$ and $\epsilon_d$ are the permittivity of the metal and insulator, respectively, and h is the height of the waveguide.

The phase compensation can be achieved by adjusting the geometric parameters of the plasmonic waveguides, including width w of the slit (the insulator layer), height h, or both and slit position. The planar example shown above in FIG. 1(c) modulates the waveguide phase through widths only, which is simpler to fabricate in practice. The phase adjustment can also be provided by using different materials, i.e., by varying $\epsilon_m$ and $\epsilon_d$.

Figure 2:
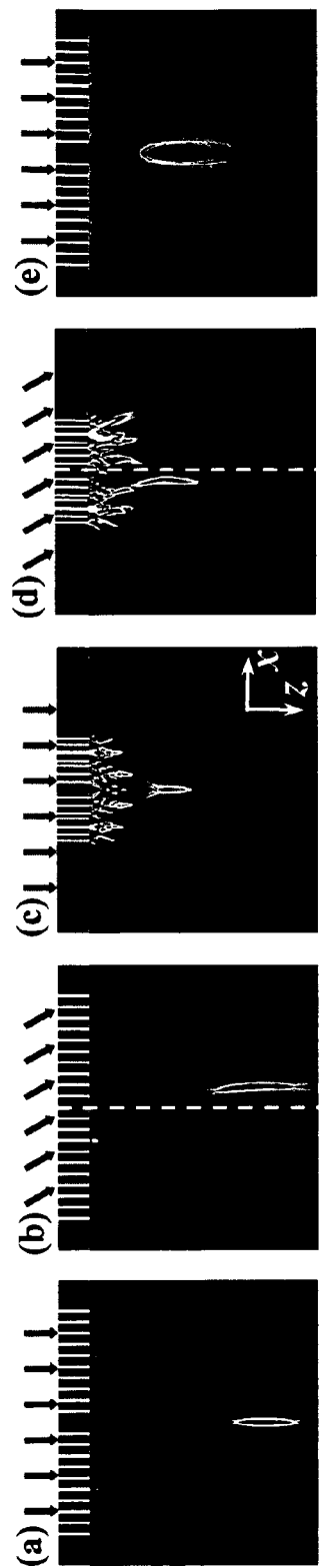
FIG. 2 shows the simulations of two metalenses that demonstrate their deep subwavelength focusing and Fourier transform functions.

Simulations were conducted for the design shown in FIG. 1(c) at the wavelength of 365 nm as an example. All simulation plots are power profiles. FIG. 2 shows the simulations of two metalenses that demonstrate their deep subwavelength focusing and Fourier transform functions. The first metalens for the simulation includes a silver PWC and a metamaterial with an elliptic dispersion ($\epsilon_x = 3.4 + 0.05$ i and $\epsilon_z = 11.3 + 0.9$ i). This lens shows a deep subwavelength focus with an FWHM of 59 nm at the focal length f=1.0 um, as shown in FIG. 2(a) for a normal plane wave and FIG. 2(b) for a tilted plane wave. The second metalens for simulation includes an aluminum PWC and a metamaterial with a hyperbolic dispersion ($\epsilon_x = 3.7 + 0.06$ i and $\epsilon_z = -8.9 + 1.8$ i), achieving a deep subwavelength focus with an FWHM of 52 nm at the focal length f=0.5 um. This is illustrated in FIG. 2(c) for a normal plane wave and in FIG. 2(d) for a tilt plane wave. The dimensions of the figures are: x=1.8 um and z=1.4 um (the metamaterial slab only). The PWC height is 200 nm, and the slit width varies with the slit location from 10 nm to 20 nm. The material in the slit is air for this simulation.

For purpose of comparison, FIG. 2(e) shows the simulation of a silver PWC in air with a diffraction-limited focal spot with FWHM=181 nm at the focal length f=0.5 um. With normal TM plane wave illumination, the metalens with an elliptic and hyperbolic dispersive metamaterial shown in FIGS. 2(a) and (c) achieved a deep subwavelength focal spot with an FWHM (full width at half maximum) of 59 nm and 52 nm, respectively. Comparing with a conventional lens in air, about three-fold resolution enhancement has been demonstrated by the two examples. With tilted illumination, the focal spot of the metalens with the elliptic dispersion shifts accordingly along the incident direction, which is similar to a conventional optical lens, as shown in FIG. 2(b). On the contrary, the focal spot shifts to the opposite side when the metalens possesses hyperbolic dispersion characteristics, as shown in FIG. 2(d). This seemingly counterintuitive behavior comes from the negative refraction experienced at the interface between a hyperbolic metamaterial and a common medium, which significantly diversifies the functionalities of a lens and an optical imaging system.

A metalens can also be structured to focus a cylindrical wave directly into an image under specific condition as a conventional lens does.

Figure 3:
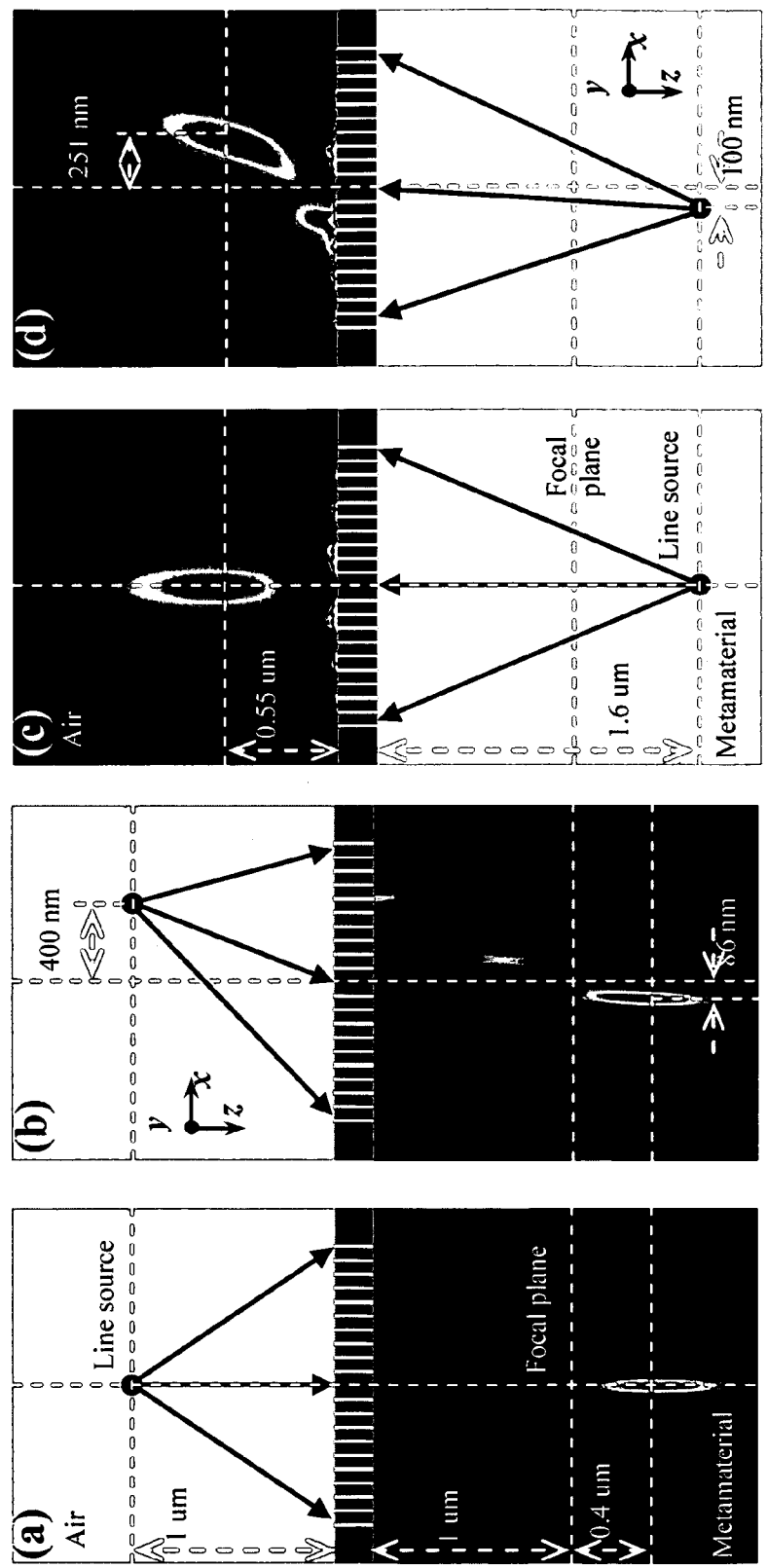
FIG. 3 shows examples of metalenses and simulations of the optical fields produced in the metalenses.

FIG. 3 shows one of such an example by way of imaging characteristics of a metalens. The dimension of the figures: x=1.8 um and z=3.7 um. The height of the PWC is 200 nm, and the slit width varies from 10 nm to 20 nm. The material in the slit is air. The metamaterial slab has an elliptic dispersion ($\epsilon_x = 3.4 + 0.05$ i and $\epsilon = 11.3 + 0.9$ i).

FIG. 3(a) shows a deep subwavelength scale image at the image distance of 1.4 um in the metamaterial is formed for a line source on the optical axis at the object distance of 1.0 um in air. FIG. 3(b) shows that the image is shifted by 86 nm when the line source is 400 nm off the optical axis in air, attaining a demagnification of 4.65. In FIG. 3(c), a wavelength scale image at the image distance of 0.55 um in air is formed for a line source on the optical axis at the object distance of 1.6 um in the metamaterial. In FIG. 3(d), the image is shifted by 251 nm when the line source is 100 nm off the optical axis in the metamaterial, attaining a magnification of 2.51. The simulated focal length in air is 180 nm.

An object in air can form its image in the metamaterials at a location between f and 2f (see FIG. 3(a)), where f is the focal length. When the line source object is 400 nm off the optical axis in air, the image is shifted by 86 nm, attaining a demagnification of 4.65, as shown in FIG. 3(b). This behavior is consistent with the case of conventional lenses; when an image is formed between f and 2f it is demagnified. The image resolution however is in deep subwavelength scale in the metamaterial due to its extraordinary material characteristics. Notably, when an object is placed between f and 2f, a magnified image is formed as shown in FIGS. 3(c) and (d). These metalens properties can be fully engineered for either lithography or imaging purpose. While the image formed by a single metalens with elliptical dispersive characteristics is inverted, a single metalens with hyperbolic dispersion has the ability to form an erect image.

The metamaterials properties used in the above demonstrations are real values based on effective media estimation in metal/dielectric multilayer composites and metallic nanowires in a dielectric matrix. The specific metalens design is presented as an example to demonstrate the concept; the resolution certainly can be further improved by more proper metamaterials designs. For the same reason, the specific 365 nm UV light wavelength in the above simulations also servers as an example frequency. The metalens concept can be extended to other light frequencies and may also be applied to any systems based on the nature of wave propagation, including electromagnetic waves, acoustic waves, etc. Similar to the microlens array or zone plate array system, an array of metalenses can also be assembled for large area processing. One practical usage of the metalens is to make its metamaterial slab as thick as the focal length or image length, so that the near field of the bottom metamaterial interface can be accessed and utilized.

The above examples show metalenses by using the combination of a nonperiodic plasmonic waveguide coupler and a metamaterial slab. Such a metalens can have similar behaviors in certain aspects and have additional unique features that are absent from a conventional optical lens. The simulation results suggest that such a metalens can perform Fourier transform, deep subwavelength focusing and imaging capabilities. The potential for super resolution in conjunction with the Fourier transformability suggest applications to nanoscale imaging, sensing and manufacturing, as well as miniaturized devices for optical data processing.

The following sections provide additional technical details in the designs and the imaging properties of metalenses. Metalenses with a hyperbolically dispersive metamaterial demonstrate unique imaging behaviors that cannot be achieved by a conventional lens. Metalenses with a hyperbolically dispersive metamaterial slab possess different imaging properties. The super resolution capability and the new imaging properties enable the metalens to be uniquely implemented in optical system design and information processing.

Figure 4:
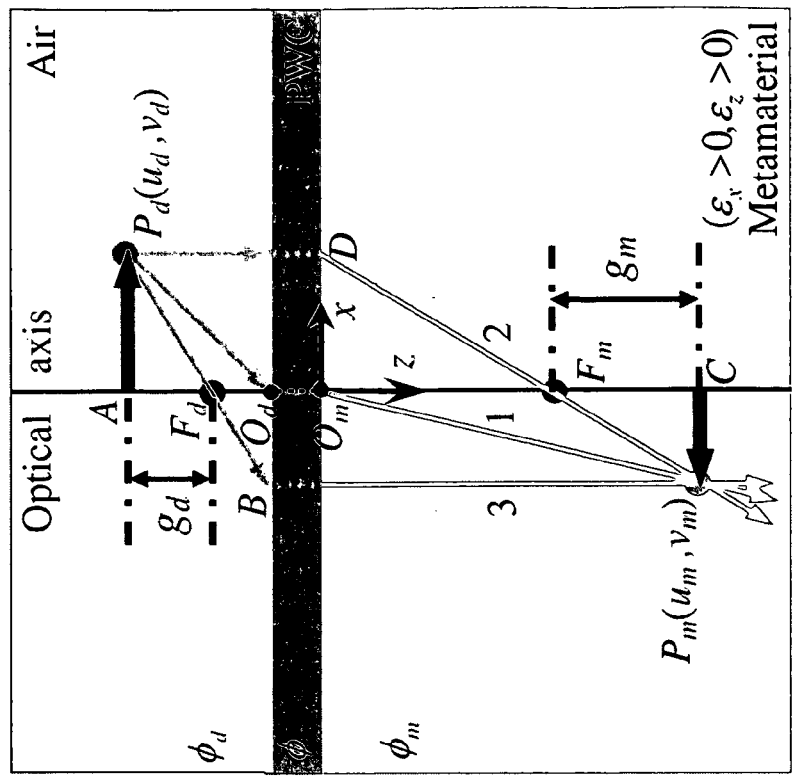
FIG. 4 shows the geometry and ray representation of a typical 2D metalens, which includes a metamaterial slab and a PWC atop.

FIG. 4 shows the geometry and ray representation of a typical 2D metalens, which includes a metamaterial slab and a PWC atop. A PWC is a piece of thin-film plasmonic metal, with many nanoscale slits or holes filled with a dielectric material, i.e., metal-insulator-metal waveguides. Representative rays of two on-axis conjugate points are also shown. This metalens is designed to have a focal length $f_m$, i.e., $\overline{O_m F_m}$, in the metamaterial, using normal plane wave illumination from air. The metalens has the Fourier transform function, i.e., can focus a plane wave to a spot. As a result, an image $P_d$ in air the may be formed for an object $P_m$ on the optical axis outside the focus $F_m$ in the metamaterial, and vice versa. The optical path length OPL from $P_d$ to $P_m$ is given by $$[OPL] = (\phi_d + \phi_m + \phi_c)/k_0$$

where $\phi_d = k_0\sqrt{v_d^2 + x^2}$ is the phase in air, $\phi_m = k_0\sqrt{\epsilon_x' v_m^2 + \epsilon_z' x^2}$ is the phase in the metamaterial, $\phi_c = \phi_{const} - k_0\sqrt{\epsilon_x' f_m^2 + \epsilon_z' x^2}$ is the designed phase profile of the PWC, $k_0$ is the wavevector in free space, with $\epsilon_x'$ and $\epsilon_z'$ being the real part of the electric permittivity of the metamaterial in the x and z directions respectively, $v_d$ being the image distance in air, $v_m$ being the object distance in the metamaterial and $\phi_{const}$ being a constant phase. According to the Fermat's Principle, the optical path length maintains stationary; that is, its derivative with respect to the position variable, which is x here, is zero[20], i.e., d[OPL]/dx=0 which leads to $$\frac{n}{\sqrt{v_d^2 + x^2}} + \frac{\epsilon_z'}{\sqrt{\epsilon_x' v_m^2 + \epsilon_z' x^2}} = \frac{\epsilon_z'}{\sqrt{\epsilon_x' f_m^2 + \epsilon_z' x^2}}$$

This relationship holds true among the parameters for a ray from $P_m$ to $P_d$. Although this expression is exact, it is rather complicated due to the dependence on x. As in the formulation of the conventional glass lens, the paraxial approximation can be applied to simplify the above relationship with n=1 for air:

$$\frac{1}{v_d} + \frac{\epsilon_z'/\sqrt{\epsilon_x'}}{v_m} = \frac{\epsilon_z'/\sqrt{\epsilon_x'}}{f_m}$$

This is the metalens imaging equation, which is similar to the thin-lens equation. When $v_d = \infty$, $v_m = f_m$, which is in consistence with the design. When $v_m = \infty$, the focal length in air is $$v_d = f_m\sqrt{\epsilon_x'}/\epsilon_z' = f_d = \overline{O_d F_d}$$

Based on the above, the following can be derived:

$$\frac{1}{v_d} + \frac{\epsilon_z'/\sqrt{\epsilon_x'}}{v_m} = \frac{1}{f_d}$$

The on-axis conjugate pair points are real and all the geometric quantities are positive numbers. As in a conventional optical glass lens, the following sign convention is used to generalize the case, as shown in Table 1.

TABLE 1

| Sign convention for metalens. | | |
|---|---|---|
| $f_m, v_d$ | + | Below $O_m$ |
| $f_d, v_d$ | + | Above $O_d$ |
| $u_m, u_d$ | + | Right of axis |
| $g_m$ | + | Below $F_m^*$ |
| $g_d$ | + | Above $F_d$ |

A metamaterial may have either a elliptic ($\epsilon_x' > 0$, $\epsilon_z' > 0$) or hyperbolic ($\epsilon_x' > 0$, $\epsilon_z' < 0$) dispersion structure. As such, the parameter $f_d$ can be either positive for a metalens with an elliptically dispersive metamaterial, which is referred to as an elliptic metalens, or negative for a metalens with a hyperbolically dispersive metamaterial, which is referred to as a hyperbolic metalens.

The following provides analysis of the location, size and orientation of an image produced by a metalens of the two types of metalenses using ray tracing: an elliptic metalens ($\epsilon_x' > 0$, $\epsilon_x' > 0$) and a hyperbolic metalens ($\epsilon_x' > 0$, $\epsilon_z' < 0$).

Figure 5:
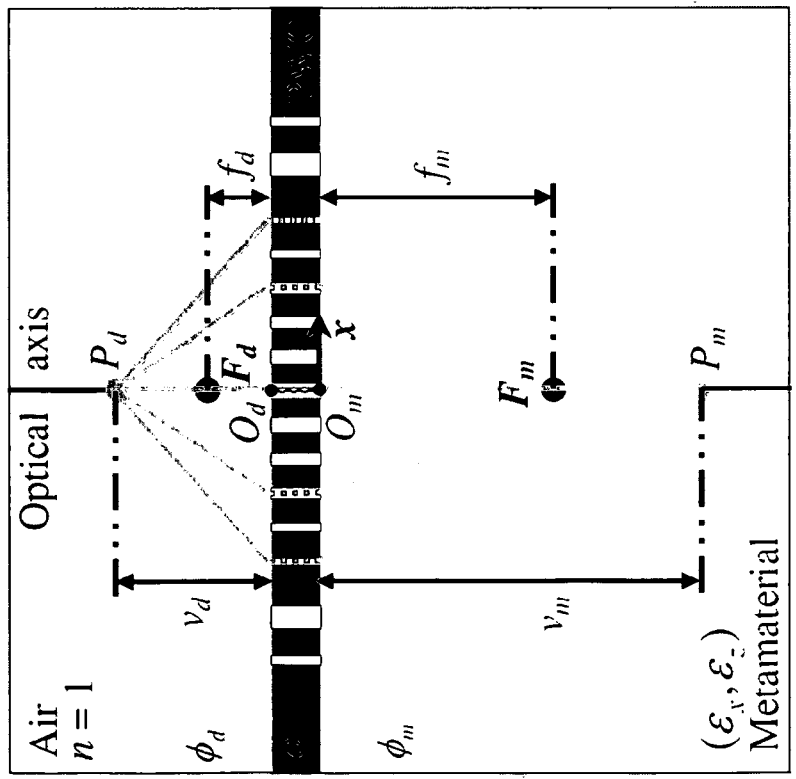
FIG. 5 shows an example of the object and the respective image for an elliptic metalens (object in air).

FIG. 5 shows an example of the object and the respective image for an elliptic metalens (object in air). Assume first the object is in air. Because triangles $P_d A F_d$ and $BO_d F_d$ are similar and triangles $P_m C F_m$ and $DO_m F_m$ are similar, the Newtonian form of the lens equation can be obtained $$f_m f_d = g_m g_d$$

where $g_d$ and $g_m$ are the object and image distance measure from the focal point $F_d$ and $F_m$ in their space, respectively. The transverse magnification $M_T$ can be written as $$M_T = \frac{u_m}{u_d} = -\frac{g_m}{f_m} = -\frac{f_d}{g_d}$$

These expressions have the same form as in the conventional optical lens. The transverse magnification can be either positive for an erect image or negative for an inverted image. The meanings associated with the signs of various parameters of a metalens is summarized in Table 2.

TABLE 2

| Meanings associated with the signs of the metalens parameters. | | |
|---|---|---|
| | Sign | |
| Parameter | + | − |
| $v_d$ | Real object | Virtual object |
| $v_m$ | Real image | Virtual image |
| $f_d$ | Converging | Diverging |
| $f_m$ | Converging | |
| $u_d$ | Erect object | Inverted object |
| $u_m$ | Erect image | Inverted image |
| $M_T$ | Erect image | Inverted image |

Table 3 summarizes the typical image configurations resulting from the juxtaposition of an elliptic metalens and a real object.

TABLE 3

Images of a real object in air formed by an elliptic metalens.
Elliptic Metalens

| Object | Image | | | |
|---|---|---|---|---|
| Location | Type | Location | Orientation | Relative size |
| $\infty > v_d > 2f_d$ | Real | $f_m < v_m < 2f_m$ | Inverted | Minified |
| $v_d = 2f_d$ | Real | $v_m = 2f_m$ | Inverted | Same size |
| $f_d < v_d < 2f_d$ | Real | $\infty > v_m > 2f_m$ | Inverted | Magnified |
| $v_d = f_d$ | | $\pm\infty$ | | |
| $v_d < f_d$ | Virtual | $|v_m| > v_d$ | Erect | Magnified |

The properties of an elliptic metalens with the object in the metamaterial are similar. Referring to Table 3, the imaging properties of an elliptic metalens are similar to a conventional optical lens.

Figure 6:
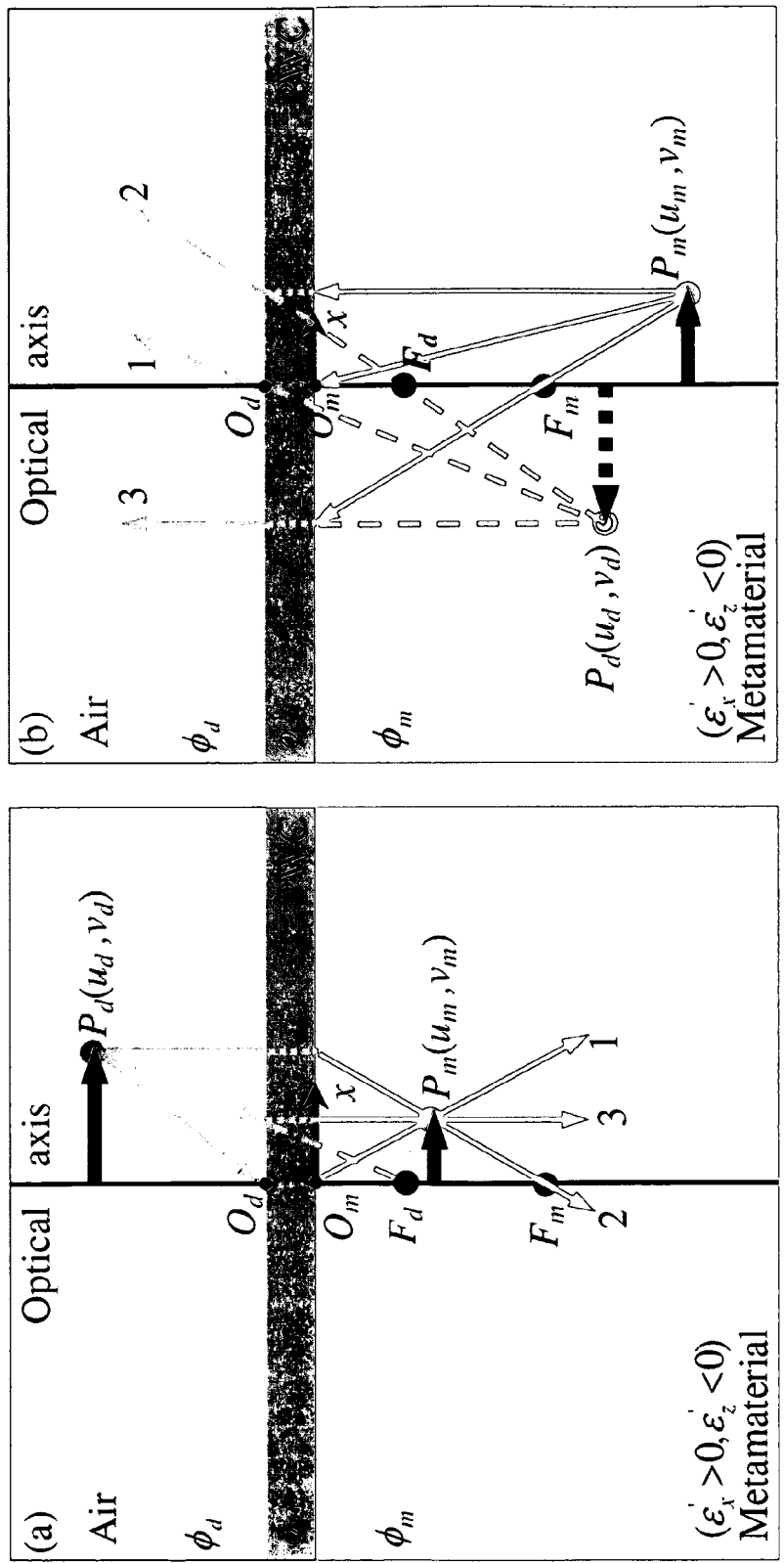
FIG. 6 shows an example of a hyperbolic metalens with (a) the object in air, and (b) the object in the metamaterial.

FIG. 6 shows an example of a hyperbolic metalens with (a) the object in air, and (b) the object in the metamaterial. Because $f_d < 0$ and $\in_z < 0$, the hyperbolic metalens behaves distinctively from a conventional optical lens. The typical image configurations resulting from the juxtaposition of a hyperbolic metalens and a real project is summarized in Table 4.

TABLE 4

Images of a real object formed by a hyperbolic metalens.
Note that $f_d < 0$.
Hyperbolic Metalens

| Object | Image | | | |
|---|---|---|---|---|
| Location | Type | Location | Orientation | Relative size |
| $\infty > v_d > 0$ | Real | $0 < v_m < f_m$ | Erect | Minified |
| $\infty > v_m > 2f_m$ | Virtual | $2f_d < v_d < f_d$ | Inverted | Minified |
| $v_m = 2f_m$ | Virtual | $v_d = 2f_d$ | Inverted | Same size |
| $f_m < v_m < 2f_m$ | Virtual | $-\infty < v_d < 2f_d$ | Inverted | Magnified |
| $v_m = f_m$ | | $\pm\infty$ | | |
| $v_m < f_m$ | Real | $\infty > v_d > 0$ | Erect | Magnified |

As suggested by Table 4, when the object is in air, the image is minified, erect, real and above the focal point $F_m$ in the metamaterial, which is completely different from the imaging behavior of a conventional optical lens or an elliptic metalens. When the object is below the focal point $F_m$ in the metamaterial, the image is virtual and inverted, instead of real and inverted as in the conventional lens. When the object is above the focal point $F_m$, the image is real and erect in air, instead of virtual and erect. These abnormal behaviors of the hyperbolic metalens, along with its super resolution capability, may have profound effect on optical system design and information processing.

Simulations have been carried out to verify the exceptional imaging behaviors of the metalenses. Since the imaging behaviors of an elliptic metalens are similar to a conventional lens, except the elliptic metalens can achieve super resolution, we focus on the hyperbolic metalens.

Figure 7:
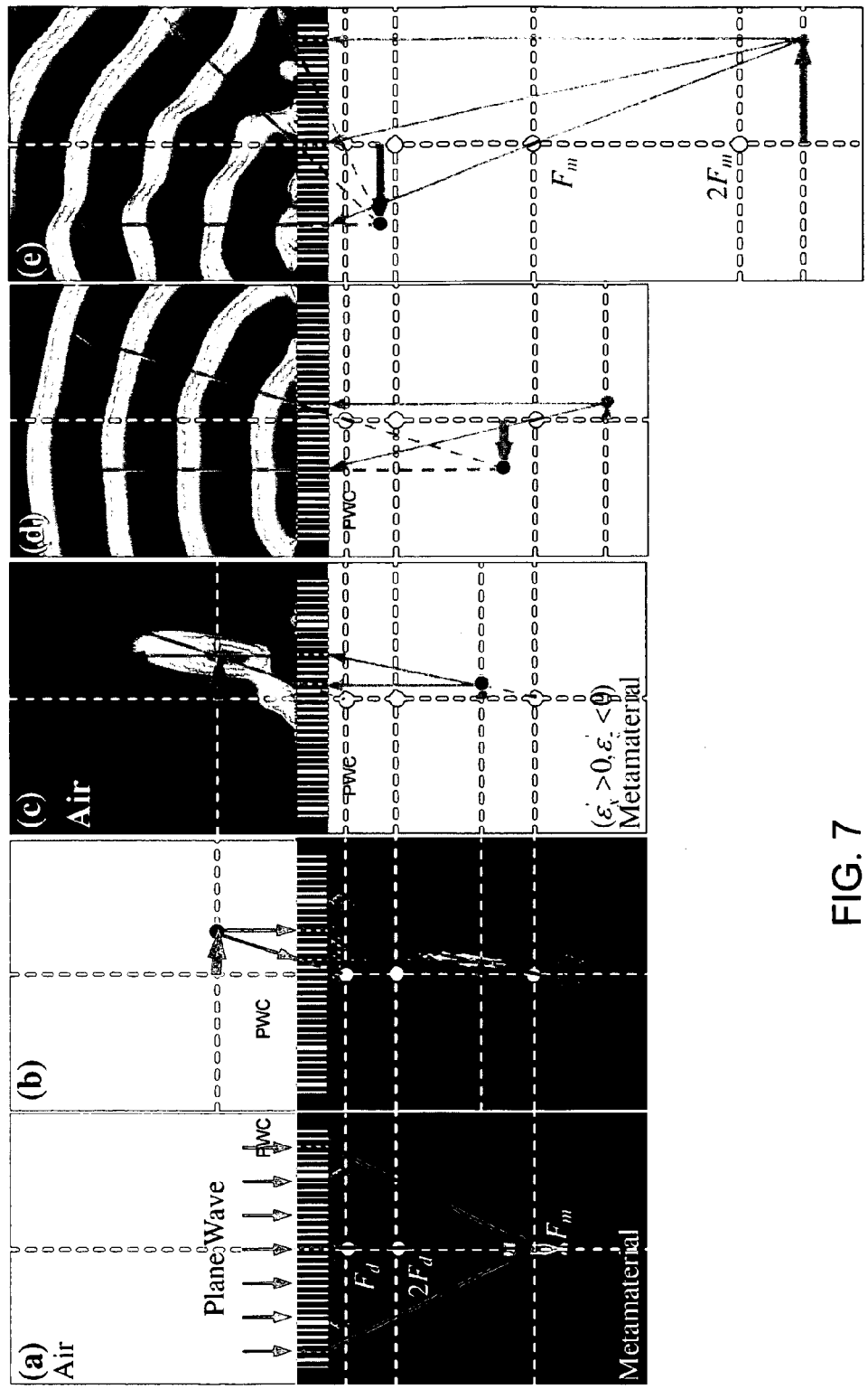
FIG. 7 shows the simulations of a hyperbolic metalens consisting of a metamaterial slab with ($\in'_x$=6.4+0.03 i, $\in'_z$=−10.3+0.2 i) and a silver PWC with a dielectric material of $\in_d$=2.0 inside its slits.

FIG. 7 shows the simulations of a hyperbolic metalens consisting of a metamaterial slab with ($\in'_x = 6.4 + 0.03$ i, $\in'_z = 10.3 + 0.2$ i) and a silver PWC with a' dielectric material of $\delta_d = 2.0$ inside its slits. FIG. 7(a) shows the design of this hyperbolic metalens, which has a designed focal length of $f_m = 2$ um and thus a negative $f_d = -0.476$ um (calculated). The analysis above predicts that when an object is in air, an erect minified real image, instead of an inverted magnified/minified real image outside the focal length in the case of a conventional optical convex lens, can always be formed above the focal point $F_m$. This exceptional imaging behavior of a hyperbolic metalens is verified in FIG. 7(b), in which the object in air is randomly chosen at ($u_d = 0.4$ um, $v_d = 0.7$ um), the minified real image is above Fm at ($u_d = 0.118$ um, $v_d = 1.46$ um). Thus the transverse magnification is $M_T = u_m/u_d \approx 0.3$ for this case. When the object is above the focal point $F_m$ in the metamaterial (i.e., $v_m < f_m$), a magnified erect real image will be formed in air, which is the reciprocal of the above case and shown in FIG. 7(c).

When the object is below $F_m$ in the metamaterial, only inverted virtual image can be formed by a hyperbolic metalens, but the image can be minified or magnified depending on the location of the object. FIGS. 7(d) and (e) show the simulations for $f_m < v_m < 2f_m$ and $\infty > v_m > 2f_m$, respectively. While an inverted magnified virtual image is formed below point $2F_d$ when $f_m < v_m < 2f_m$, an inverted minified virtual image is formed between points $F_d$ and $2F_d$ when $\infty > v_m > 2f_m$. Both cases are consistent with the analysis for the imaging properties of the hyperbolic metalens above. It can be easily seen that most of these behaviors are opposite to the conventional optical lens.

Super-resolution metalenses can be constructed by combining metamaterials and nanoscale plasmonic waveguide couplers. The following sections provide examples to show details of designing a metalens, including the general requirements for the metamaterial of a metalens, the phase calculations originating from the propagation in the waveguides and the metamaterial. Elliptic and hyperbolic metalenses can be designed by tuning the height of plasmonic waveguides with the same width.

Figure 8:
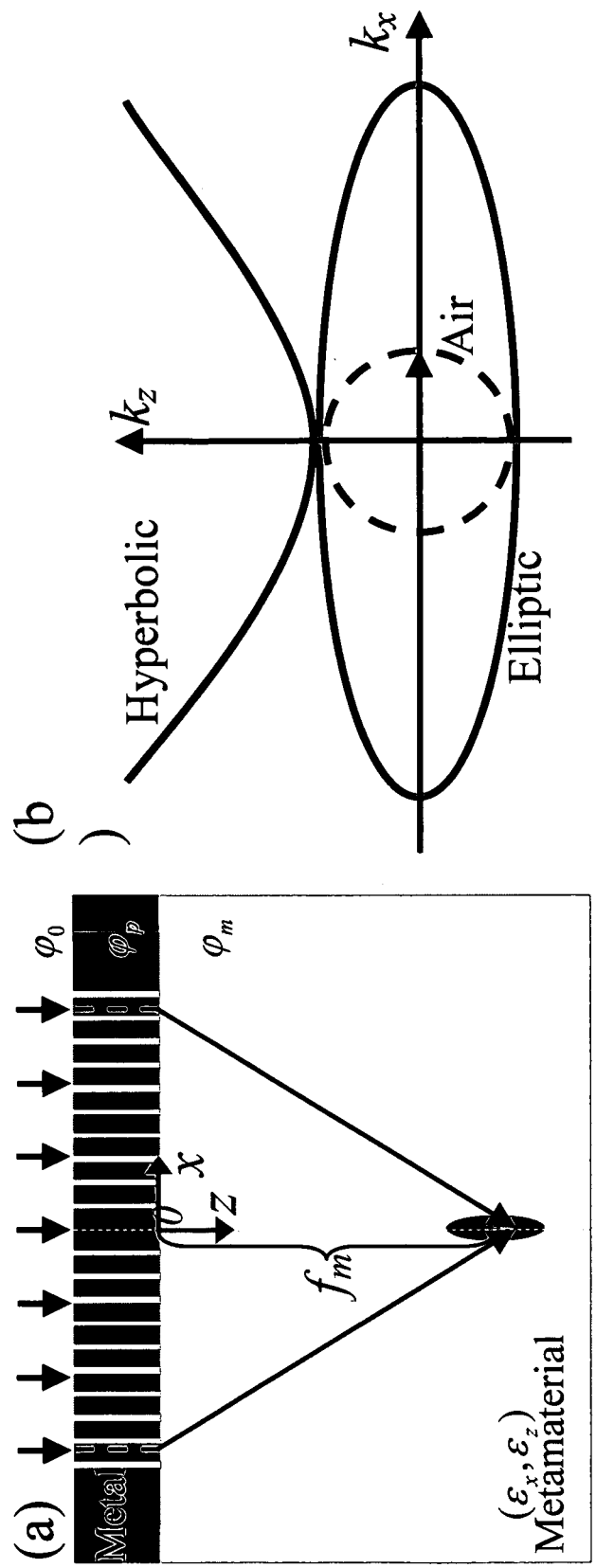
FIG. 8 shows a structure of a metalens with a metamaterial slab and a phase compensation element.

FIG. 8 shows a structure of a metalens with a metamaterial slab and a phase compensation element. The phase compensation element in this example a PWC with a nonperiodic plasmonic waveguide array. The metamaterial is structured to have high transverse wavevector coverage to achieve the super resolving power. In general, both the permittivity and permeability of metamaterials can be designed for novel devices and operations. Plasmonic metamaterials can be designed by tuning only the permittivities to achieve relatively low loss. The equi-frequency contour (EFC) of the metamaterial of a metalens is a non-planar surface that is not flat, as is exampled by a ellipse and a hyperbola in FIG. 8(b) (2D for simplicity).

The non-flat EFC of the metamaterial allows waves with various wavevectors in such a metamaterial to propagate in different directions such that the rays of an incident plane wave at different positions can propagate toward a point (e.g., the focus) in different directions. A focus is obtained when all these rays coming in different directions have the same phase and thus constructively interfere with one another at the focal point. The PWC is unique to the high wavevector coupling and phase compensation.

The PWC in a metalens can be a nonperiodic metal-insulator-metal (MIM) waveguide array that is designed to provide phase compensation to the rays in different directions for focusing inside a metamaterial at the nanoscales, because the modal index β of an MIM waveguide can be tuned in a large range by material and geometric parameters as a result of the plasmonic effect.

Figure 9:
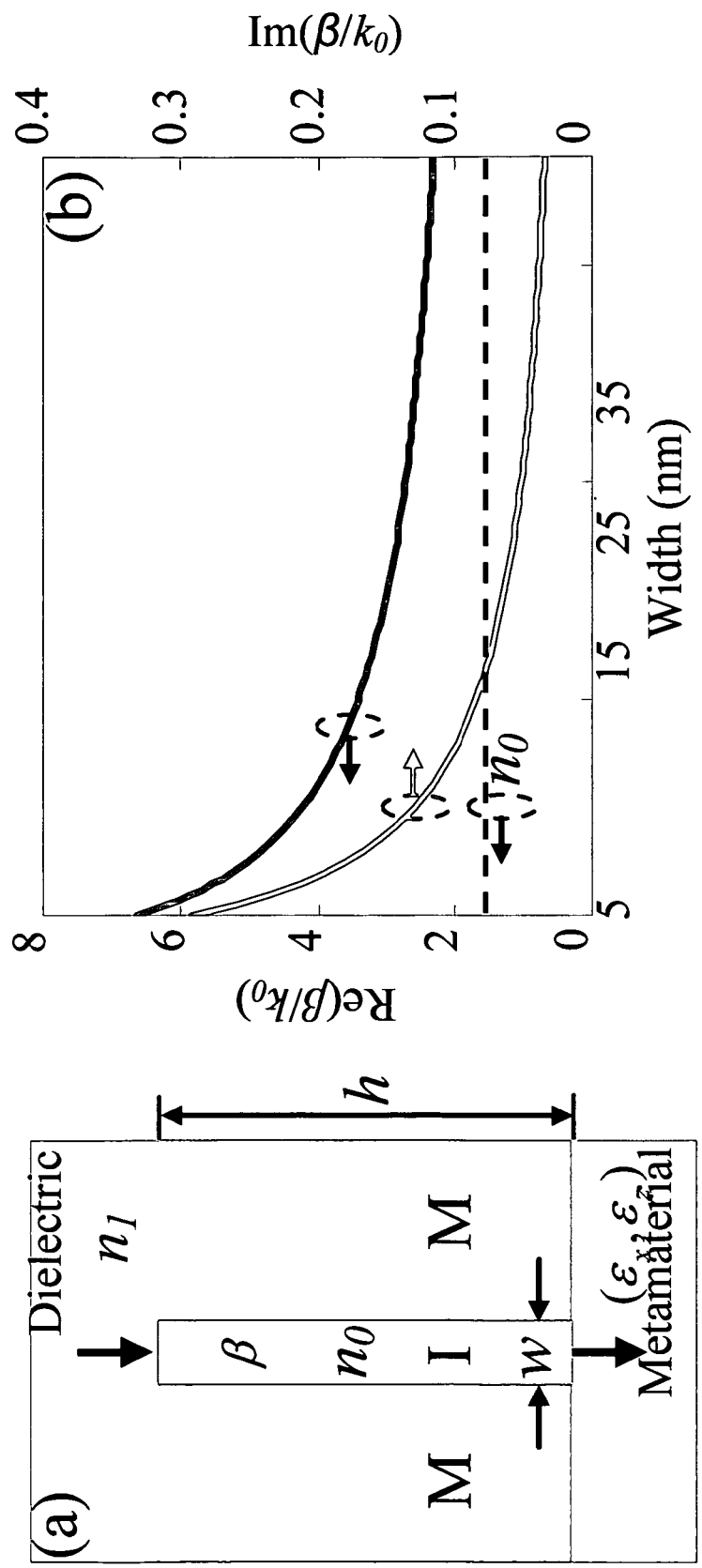
FIG. 9 shows the schematic of a nonperiodic metal-insulator-metal (MIM) waveguide above a metamaterial and a large β range simply tuned by varying the width w of its insulator layer.

FIG. 9 shows the schematic of a MIM waveguide above a metamaterial and a large β range simply tuned by varying the width w of its insulator layer. FIG. 9(a) shows schematic of a metal-insulator-metal (MIM) waveguide above a metamaterial. FIG. 9(b) shows the dependence of the modal index of a nanoscale MIM waveguide on the width w of the insulator layer. The upper curve represents the real part and the lower curve represents the imaginary part. Data obtained using infinite thick silver and a dielectric with a refractive index $n_0=1.5$. The dashed line represents the propagation constant of a plane wave in the core dielectric material $n_0$.

Considering normal plane wave incidence, light is coupled into the Eigenmode of the MIM waveguide, then propagates along the waveguide and undergoes Fabry-Perot like multiple round-trips due to the reflections at the inlet and outlet of the waveguide. The phase change of the light finally transmitted to the metamaterial at the outlet (the interface between the waveguide and the metamaterial) can be derived as $$\phi_p = \phi_1 + \phi_2 + \Omega + \phi_w$$

where $\phi_1 = \arg[2n_1/(\beta+n_1)]$ and $\phi_2 = \arg[2\beta/(\beta+\sqrt{\epsilon_x})]$ are the phase changes at the inlet and the outlet of the waveguide, respectively;

$$\Omega = \arg\{1-[(\beta-n_1)/(\beta+n_1)][(\beta-\sqrt{\epsilon_x})/(\beta+\sqrt{\epsilon_x})]e^{-i2\beta h}\}^{-1}$$ is the phase change resulting from the Fabry-Perot like oscillations; $\phi_w = \mathrm{Re}(\beta h)$ is the phase retardation of the waveguide Eigenmode propagation; $n_1$ is the refractive index of the dielectric above the waveguide and $\epsilon_x$ is the permittivity of the metamaterial in the x direction. Numerical calculations show that, in many practice circumstances, $\phi_w$ is usually much larger than $\phi_1$, $\phi_2$ and $\Omega$ in practical design, thus $\phi_p$ can be approximated as $\mathrm{Re}(\beta h)$.

Figure 10:
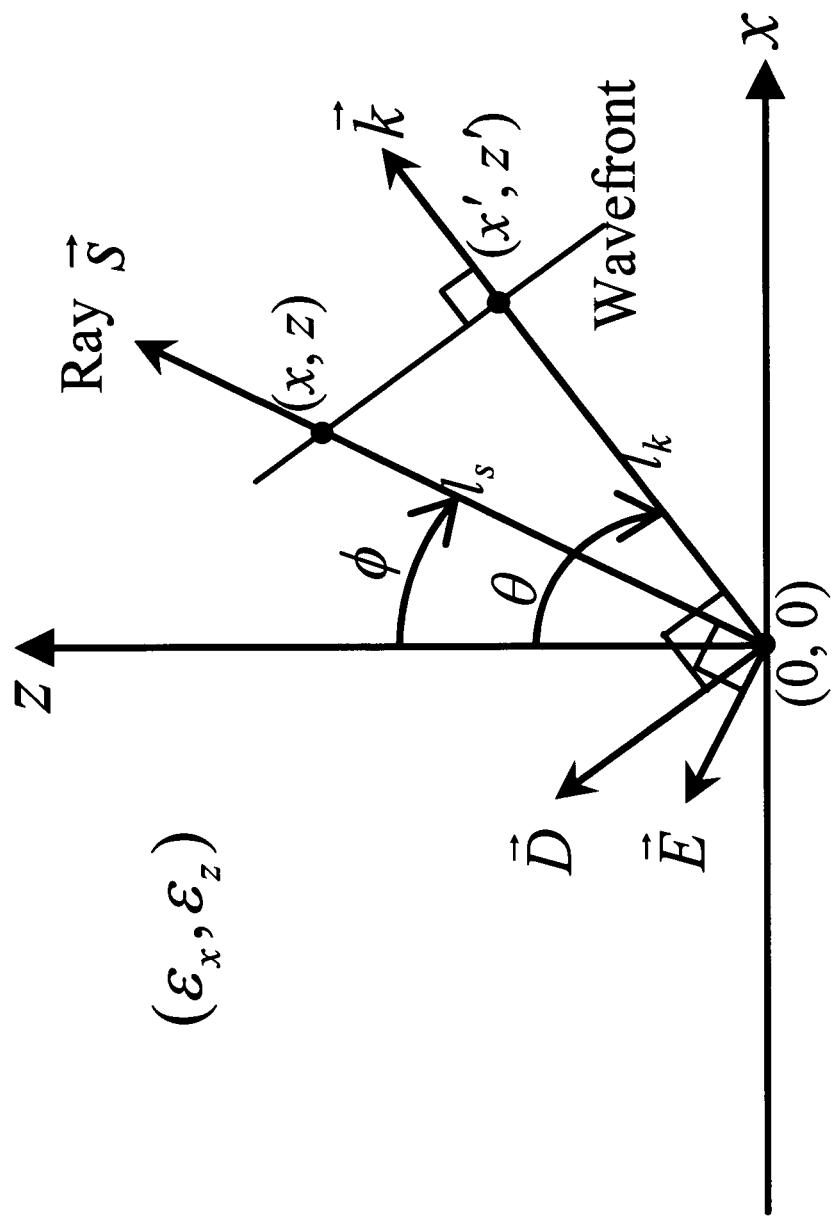
FIG. 10 shows a diagram for the group velocity (ray direction) and phase velocity (wavevector direction) of a ray in a uniaxial anisotropic medium with permittivities ($\in_x$, $\in_z$) with one of the points located at the origin.

The phase delay in a uniaxial anisotropic metamaterial $\phi_m$ may be derived by analyzing the relation of the phase and group velocities of a ray between two points in the material. FIG. 10 shows a diagram for the group velocity (ray direction) and phase velocity (wavevector direction) of a ray in a uniaxial anisotropic medium with permittivities ($\epsilon_x$, $\epsilon_z$) with one of the points located at the origin. Because of the material anisotropy, group and phase velocities are in different directions, for which the relation is $\tan\theta = (\epsilon_z/\epsilon_x)\tan\phi$, where $\theta$ and $\phi$ are the angles between the phase velocity (the wavevector $\vec{k}$ direction) and the group velocity (the ray direction) with respect to the z axis, respectively. When the ray propagates from the origin (0, 0) to point (x, z), the phase velocity propagates to point (x', z'); both points are on the same wavefront that is normal to the $\vec{k}$ direction, as shown in FIG. 10. Because the effective index in the k direction can be written as $n_{\mathit{eff}}(\theta) = 1/\sqrt{\cos^2\theta/\epsilon_x + \sin^2\theta/\epsilon_z}$, the phase difference between points (0, 0) and (x', z') is expressed as $\Delta p = n_{\mathit{eff}}(\theta)k_0 l_k$, where $l_k = l_s \cos(\theta-\phi)$ is the distance between (0, 0) and (x', z'), $k_0$ is the wavevector in vacuum, and $l_s = \sqrt{x^2+z^2}$ is the distance between (0, 0) and (x, z). The phase difference $\phi_m$ can be written as $$\phi_m = k_0\sqrt{\epsilon_x f_m^2 + \epsilon_z x^2}$$

with $f_m$ being the focal length of the metalens in the metamaterial. The above relationship for $\phi_m$ can be used for both elliptically and hyperbolically dispersive metamaterials. It can be approximated by $k_0\sqrt{\epsilon'_x f_m^2 + \epsilon'_z x^2}$, with the prime taking the real part of the complex permittivities, when the metamaterial is not working under resonant conditions.

The above relationships can be used to estimate the phase changes originating from the light propagation in the MIM waveguides $\phi_p$ and the metamaterial $\phi_m$. Using the metalens phase condition for plane wave focusing, i.e., $\phi_p + \phi_m = \phi_{const} + 2l\pi$ with $\phi_{const}$ being a constant phase and l being an integer, the MIM waveguide properties at different locations required for a metalens can be calculated and thus a metalens with a focal length $f_m$ can be designed.

In general, both material and geometric parameters can be tuned to satisfy the phase condition in designing a metalens. Varying only the geometric parameters may have the benefit of easier fabrication. One approach is to tune the width of the waveguides to attain different propagation constants that satisfy the phase condition, while maintaining the same waveguide height everywhere. A metalens can also be designed by using MIM waveguides with same width (thus same propagation constant) but different height h at different locations. Designing new metalenses with height tuning PWCs is now described below as an example.

Figure 11:
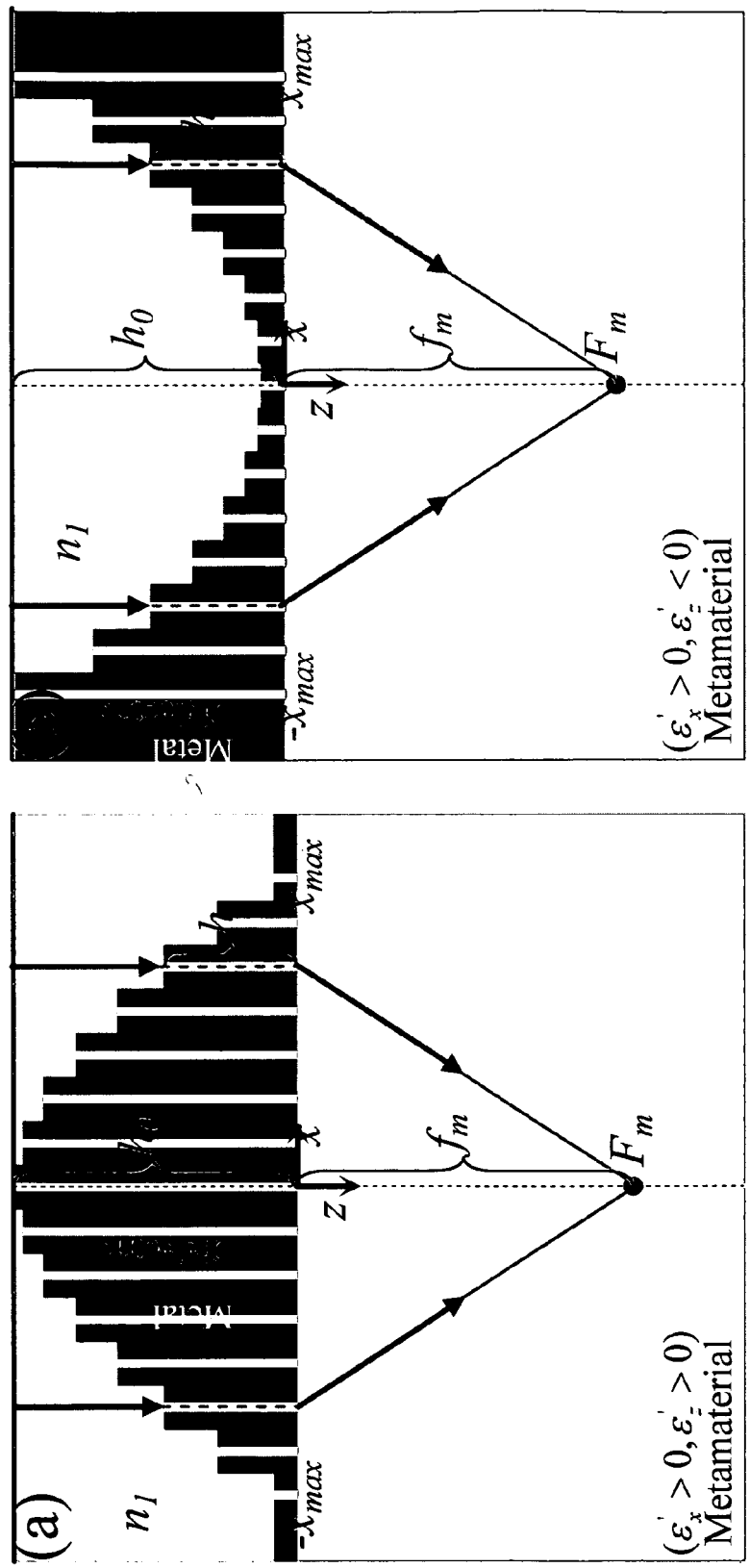
FIG. 11 shows an example of an elliptic metalens in FIG. 11(a) and a hyperbolic metalens in FIG. 11(b) with a height tuning PWC.

FIG. 11 shows an example of an elliptic metalens in FIG. 11(a) and a hyperbolic metalens in FIG. 11(b) with a height tuning PWC. It is assumed that design is for an elliptic metalens and a hyperbolic metalens with a focal length $f_m$ in the metamaterial and $x \in [-x_{max}, x_{max}]$. After a metameterial with ($\epsilon_x$, $\epsilon_z$) is chosen, the remaining task is to determine the height profile of the PWC, of which the propagation constant of the MIM waveguides is Q. When a plane wave is incident on the metalenses from the top, the waveguide Eigenmode is launched and the light continues to propagate to the interface between the waveguides and metamaterial. Because each waveguide is at the deep subwavelength scale, the output can be considered as a line source, which contains a broad range of wavevectors. Therefore, high frequency spatial information can be coupled into the metamaterial and contribute to the focus at $F_m$. The phase condition for constructive interference at $F_m$ results in the following equation $$\phi_{tot} = k_0\sqrt{\epsilon'_x f_m^2 + \epsilon'_z x^2} + k_0 \beta h + k_0(h_0-h)n_1$$

where the total phase delay $\phi_{tot} = k_0\sqrt{\epsilon'_x f_m^2} + k_0\beta h_0$ for the elliptic metalens and $\phi_{tot} = k_0\sqrt{\epsilon'_x f_m^2 + \epsilon'_z x_{max}^2} + k_0\beta h_0$ for the hyperbolic one. By setting $n_1=1$ for air, the height profile of the waveguides at different x positions is given by $$h(x) = (\phi_{tot} - k_0\sqrt{\epsilon'_x f_m^2 + \epsilon'_z x^2} - k_0 h_0)/[k_0(\beta-1)]$$

The above relationship can be used to determine the height profile for both the elliptic and the hyperbolic metalenses. Note that the negative $\epsilon_m'$ imposes a limit for the width of a hyperbolic metalens, i.e., $x_{max} < f_m\sqrt{-\epsilon'_x/\epsilon'_z}$.

Figure 12:
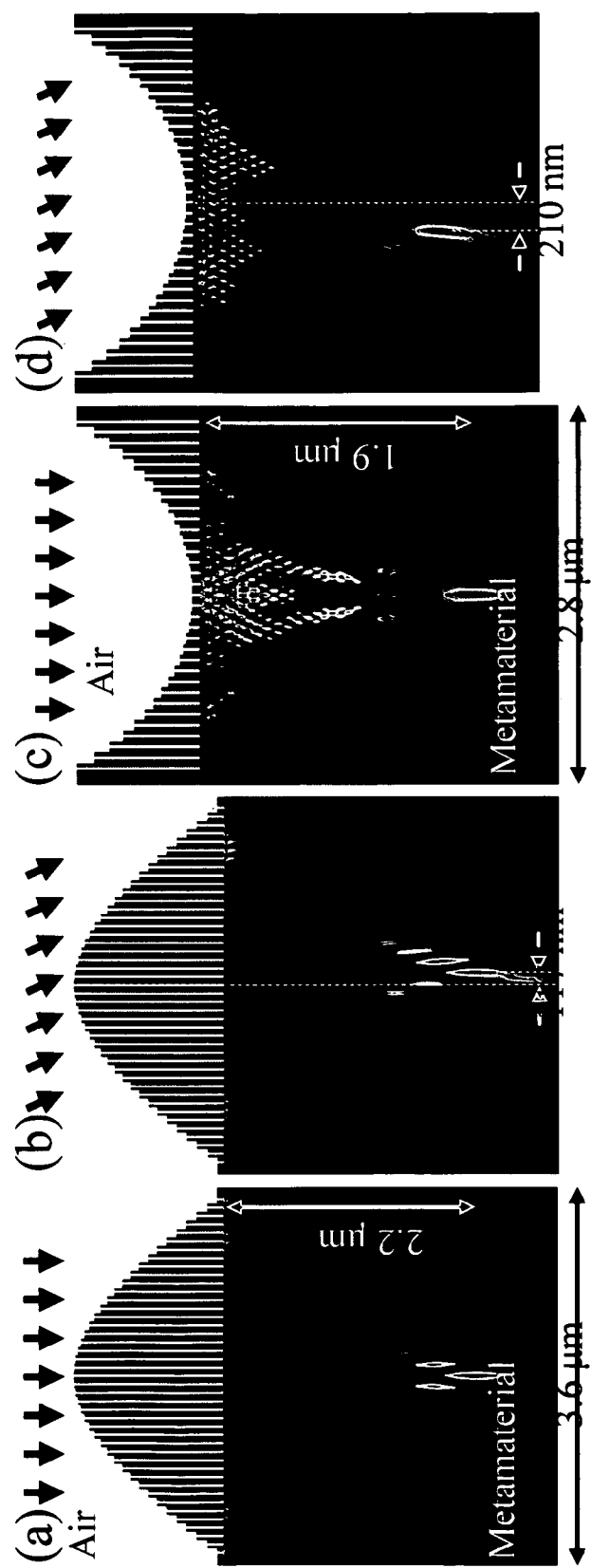
FIG. 12 shows simulations of an elliptic metalens with a height tuning PWC, illuminated by (a) a normal and (b) a tilted plane wave, respectively, and simulations of a hyperbolic metalens with a height tuning PWC, illuminated by (c) a normal and (d) a tilted plane wave, respectively.

Simulations were conducted to verify the analysis above for both cases at the wavelength of 633 nm. FIG. 12 shows simulations of an elliptic metalens with a height tuning PWC, illuminated by (a) a normal and (b) a tilted plane wave, respectively, and simulations of a hyperbolic metalens with a height tuning PWC, illuminated by (c) a normal and (d) a tilted plane wave, respectively.

More specifically, FIG. 12(a) shows the simulated power profile of an elliptic metalens with a PWC having different waveguide heights by a normal plane wave. The permittivity of the elliptic metamaterial is $\epsilon_x = 5.1+0.1\,i$ and $\epsilon_z = 16+0.08\,i$. The MIM waveguide structure is Ag/Alumina/Ag with a constant Core width of 20 nm and a constant spacing of 60 nm (i.e., the period is 80 nm). The PWC consists of 43 MIM waveguides, of which the height varies gradually from 50 nm at the edges to 1332 nm at the center ($h_0$). The focal length of the elliptic metalens is $f_m=2.2$ μm. It achieves a focus with a width of 74 nm (~λ/8.6), measured by the full width at half maximum (FWHM), for the normal plane wave incidence. When the incident light is tilted, the focus is shifted accordingly, as shown in FIG. 12(b). Because of the elliptic dispersion, the shifting direction is similar to that in a conventional lens case and the previously illustrated elliptic metalens with a width tuning PWC. The simulation in FIG. 12(b) shows a shift of 117 nm for an incident plane wave tilted at the angle of 16.4 degrees with respect to the z axis.

The elliptic metalens with a height tuning PWC shows its super resolution performance with a focus shifting behavior similar to that of a conventional lens and the elliptic metalens with a width tuning PWC. The hyperbolic metalens with a height tuning PWC is expected to behave similar to the previously illustrated hyperbolic metalens with a width tuning PWC; thus the focus shifting behavior of such a hyperbolic metalens will be opposite to that of a conventional lens. The simulations for a hyperbolic metalens shown in FIGS. 12(c) and 12(d) confirm this conclusion, with (c) and (d) being illuminated with a normal and a tilted plane wave, respectively, in which the opposite focus shifting behavior is clearly seen. The permittivity of the hyperbolic metamaterial is $\epsilon_x=8.1+0.1$ i and $\epsilon_z=-12.5+0.3$ i. The PWC of the hyperbolic metalens is composed of 33 Ag/Alumina/Ag waveguides with the same width parameters as those in the elliptic metalens above. The height profile of the waveguides of the hyperbolic metalens, varying fibril 50 nm at the center to 851 nm at the edges ($h_0$), is concave, which is opposite to the convex one of the elliptic metalens. The focal length of the hyperbolic metalens is $f_m=1.9$ μm. It achieves a focus with a width of 90 nm (~λ/7.0) for the normal plane wave incidence. The simulation in FIG. 12(d) shows a shift of 210 nm for an incident plane wave tilted at the angle of 39.4 degrees with respect to the vertical direction.

The elliptic and hyperbolic metalenses with height tuning PWCs can achieve super resolution and focus plane waves. While the hyperbolic metalens achieves focusing by a convex profile PWC and shows a normal focus shifting behavior, the hyperbolic one achieves focusing by a concave profile PWC and shows an exotic focus shifting behavior. Because the metalenses can focus plan waves, they have the Fourier transform capability. Therefore, the above described metalenses with height tuning PWCs possess properties of the metalenses, adding a new member to the metalens family.

The presented metalenses with height tuning PWCs are not planar. The width of the waveguides is equal and may avoid using narrow. MIM waveguides. The height tuning PWCs have similarities with the shapes of the metamaterial immersion lenses (MILs) in that both the elliptic metalens and the elliptic MIL have a convex PWC and interface, respectively, and both the hyperbolic metalens and the hyperbolic MIL need a concave PWC and interface, respectively. The PWC offers more flexibility to tune its height using different waveguide material combinations and thus the PWC may be shorter than the curved interfaces of the MILs. Although the height tuning PWC based metalenses are illustrated at a visible light frequency in 2D, they can be extended to other light frequencies, electromagnetic waves, and even acoustic waves in both 2D and 3D.

The following sections provide more detailed analysis of a metalens having a metamaterial slab and a plasmonic waveguide coupler (PWC) to have a focal length $f_m$ in the metamaterial using phase compensation for normal plane wave illumination from air.

Figure 13A:
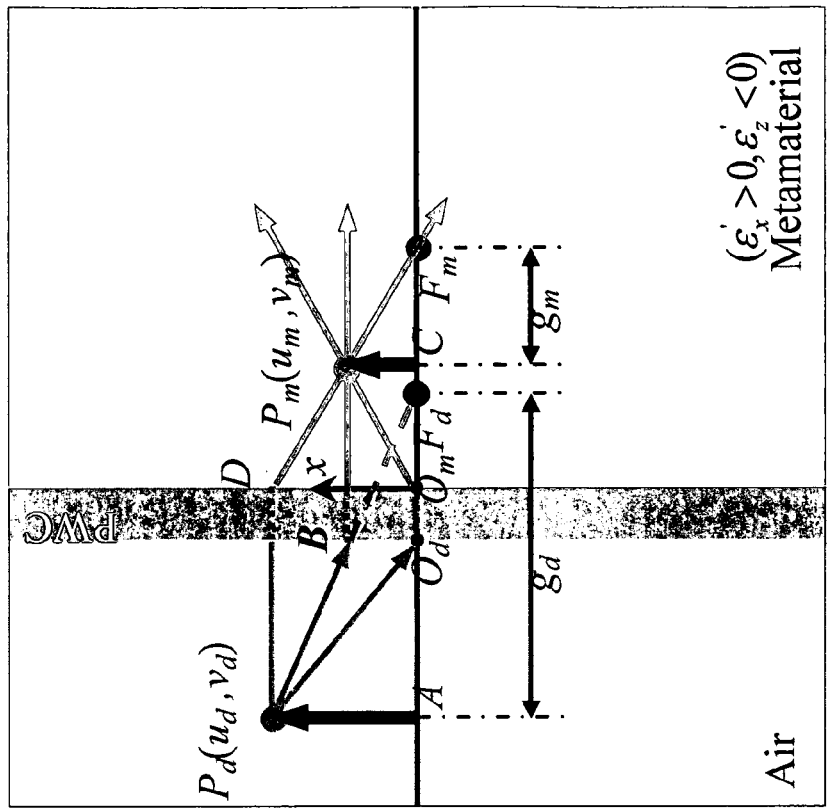
FIG. 13 shows the geometry and ray representation of a 2D metalens

FIG. 13 shows the geometry and ray representation of a 2D metalens. An image $P_d$ in air may be formed for an object $P_m$ on the optical axis outside the focus $F_m$ in the metamaterial, and vice versa. The optical path length (OPL) from $P_d$ to $P_m$ is given by $$[OPL]=(\phi_d+\phi_m+\phi_c)/k_0$$

where $\phi_d=k_0\sqrt{v_d^2+x^2}$ is the phase delay in air, $\phi_m=k_0\sqrt{\epsilon'_x v_m^2+\epsilon'_z x^2}$ is the phase delay in the metamaterial, $\phi_c=\phi_{const}-k_0\sqrt{\epsilon'_x f_m^2+\epsilon'_z x^2}$ is the designed phase delay profile of the PWC according to the metalens design principle[S1], with $\epsilon'_x$ and $\epsilon'_z$ being the real part of the electric permittivity of the metamaterial in the x and z directions respectively, $\phi_d$ being the image distance in air, $v_m$ being the object distance in the metamaterial and const being a constant phase.

According to the Fermat's Principle, the optical path length remains stationary; that is, its derivative with respect to the position variable, which is x here, is zero, i.e., d[OPL]/dx=0, which leads to:

$$\frac{n}{\sqrt{v_d^2+x^2}} + \frac{\epsilon'_z}{\sqrt{\epsilon'_x v_m^2+\epsilon'_z x^2}} = \frac{\epsilon'_z}{\sqrt{\epsilon'_x f_m^2+\epsilon'_z x^2}}$$

This relationship holds true among the parameters for each ray from $P_m$ to $P_d$. Under the paraxial approximation and with n=1 for air, the above relationship can be reduced to $$\frac{1}{v_d} + \frac{\epsilon'_z/\sqrt{\epsilon'_x}}{v_m} = \frac{\epsilon'_z/\sqrt{\epsilon'_x}}{f_m}$$

This metalens imaging equation is similar to the thin-lens equation. Parameters $v_d$, $v_m$ and $f_m$ are positive distances measured from $O_d$ and $O_m$ respectively, and can be negative when they are in the opposite side with respect to $O_d$ and $O_m$ respectively. This is the basis of the adopted sign convention for metalenses shown in Table 5. When $v_d=\infty$, i.e., the metalens is illuminated with a plane wave in air, $v_m=f_m$, which is in consistence with the design. When $v_m=\infty$, the focal length in air is obtained $$v_d=f_m\sqrt{\epsilon'_x/\epsilon'_z}=f_d\times\overline{O_d F_d}$$

The relation between $f_d$ and $f_m$ can be rewritten as $$\frac{1}{v_d} + \frac{\epsilon'_z/\sqrt{\epsilon'_x}}{v_m} = \frac{1}{f_d}$$

As in a conventional optical glass lens, the following sign convention is adopt, as shown in Table 5. Note that $u_m$, $u_d$, $g_m$ and $g_d$ in Table 5 are geometric quantities and are used in FIG. 13B.

TABLE 5

| Sign convention for metalens. | | |
| --- | --- | --- |
| $f_m$, $v_m$ | + | Right of $O_m$ |
| $f_d$, $v_d$ | + | Left of $O_d$ |
| $u_m$, $u_d$ | + | Above axis |
| $g_m$ | + | Right of $F_m$ |
| $g_d$ | + | Left of $F_d$ |

According to this sign convention, $f_m$ is positive as it is designed so in the metamaterial. The metamaterial may have either elliptic ($\epsilon_x'>0$, $\alpha_z'>0$) or hyperbolic ($\epsilon_x'>0$, $\alpha_z'<0$) dispersion. The parameter $f_d$ can be either positive for a metalens with an elliptically dispersive metamaterial, which is referred to as an elliptic metalens, or negative for a metalens with a hyperbolically dispersive metamaterial, which is referred to as a hyperbolic metalens.

Figure 13B:
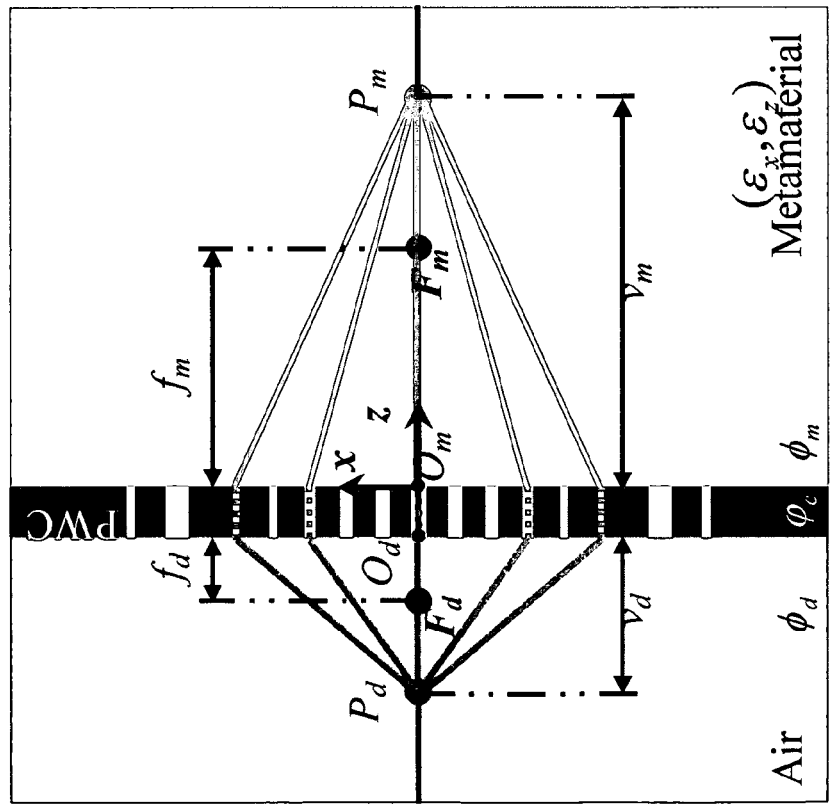

Assuming an object is in air, FIG. 13B shows the object $P_d(u_d, v_d)$ and image $P_m(u_m, v_m)$ locations for a hyperbolic metalens, where $u_d$ and $u_m$ are the distance of the object and image to the optical axis respectively and their signs are defined in Table 5. Because triangles $P_d A F_d$ and $BO_d F_d$ are similar and triangles $DO_mF_m$ and $P_mCF_m$ are similar, the Newtonian form of the lens equation can be easily obtained $$f_m f_d = g_m g_d$$

where $g_d$ and $g_m$ are the object and image distance measured from the focal point $F_d$ and $F_m$ in their space respectively. Their signs are defined in Table 5. Using equation (S6), the transverse magnification $M_T$ can be written as $$M_T = \frac{u_m}{u_d} = -\frac{g_m}{f_m} = -\frac{f_d}{g_d}$$

The transverse magnification can be either positive for an erect image or negative for an inverted image. The meanings associated with the signs of the various parameters of a hyperbolic metalens are summarized in Table 6.

TABLE 6

Meanings associated with the signs of the metalens parameters.

| | Sign | |
|---|---|---|
| Parameter | + | − |
| $v_d$ | Real object | Virtual object |
| $v_m$ | Real image | Virtual image |
| $f_d$ | Converging | Diverging |
| $f_m$ | Converging | |
| $u_d$ | Erect object | Inverted object |
| $u_m$ | Erect image | Inverted image |
| $M_T$ | Erect image | Inverted image |

Table 7 shows imaging properties of a hyperbolic metalens with $f_m<0$

TABLE 7

Images of a real object formed by a hyperbolic metalens. $f_m < 0$.

| Object Location | Image | | | |
|---|---|---|---|---|
| | Type | Location | Orientation | Relative size |
| $\infty > v_m > 0$ | Real | $0 < v_d < f_d$ | Erect | Minified |
| $\infty > v_d > 2f_d$ | Virtual | $2f_m < v_m < f_m$ | Inverted | Minified |
| $v_d = 2f_d$ | Virtual | $v_m = 2f_m$ | Inverted | Same size |
| $f_d < v_d < 2f_d$ | Virtual | $-\infty < v_m < 2f_m$ | Inverted | Magnified |
| $v_d = f_d$ | | $\pm\infty$ | | |
| $v_d < f_d$ | Real | $0 < v_m < \infty$ | Erect | Magnified |

Figure 14:
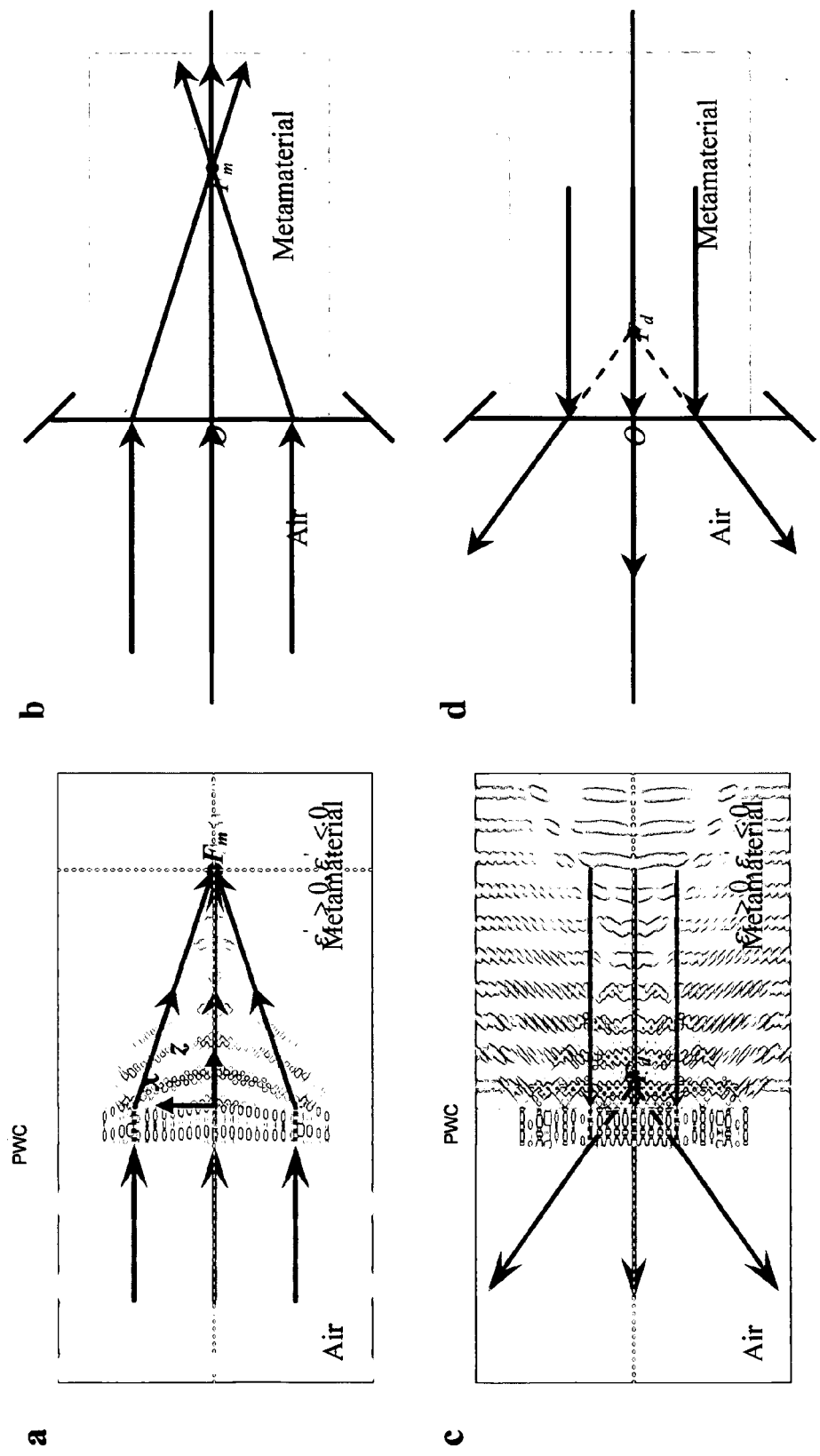
FIGS. 14, 15 and 16 show simulations for one hyperbolic metalens design at the wavelength of 690 nm.
Figure 15:
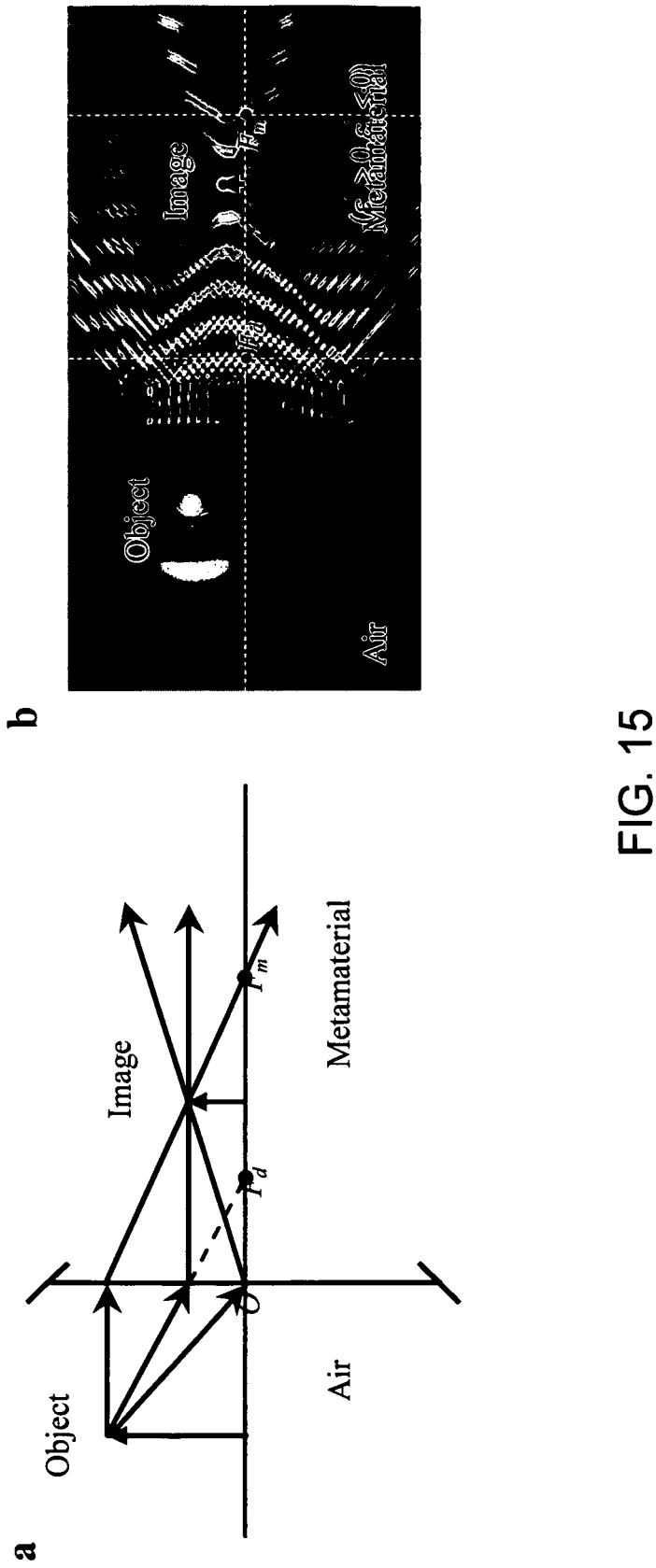
Figure 16:
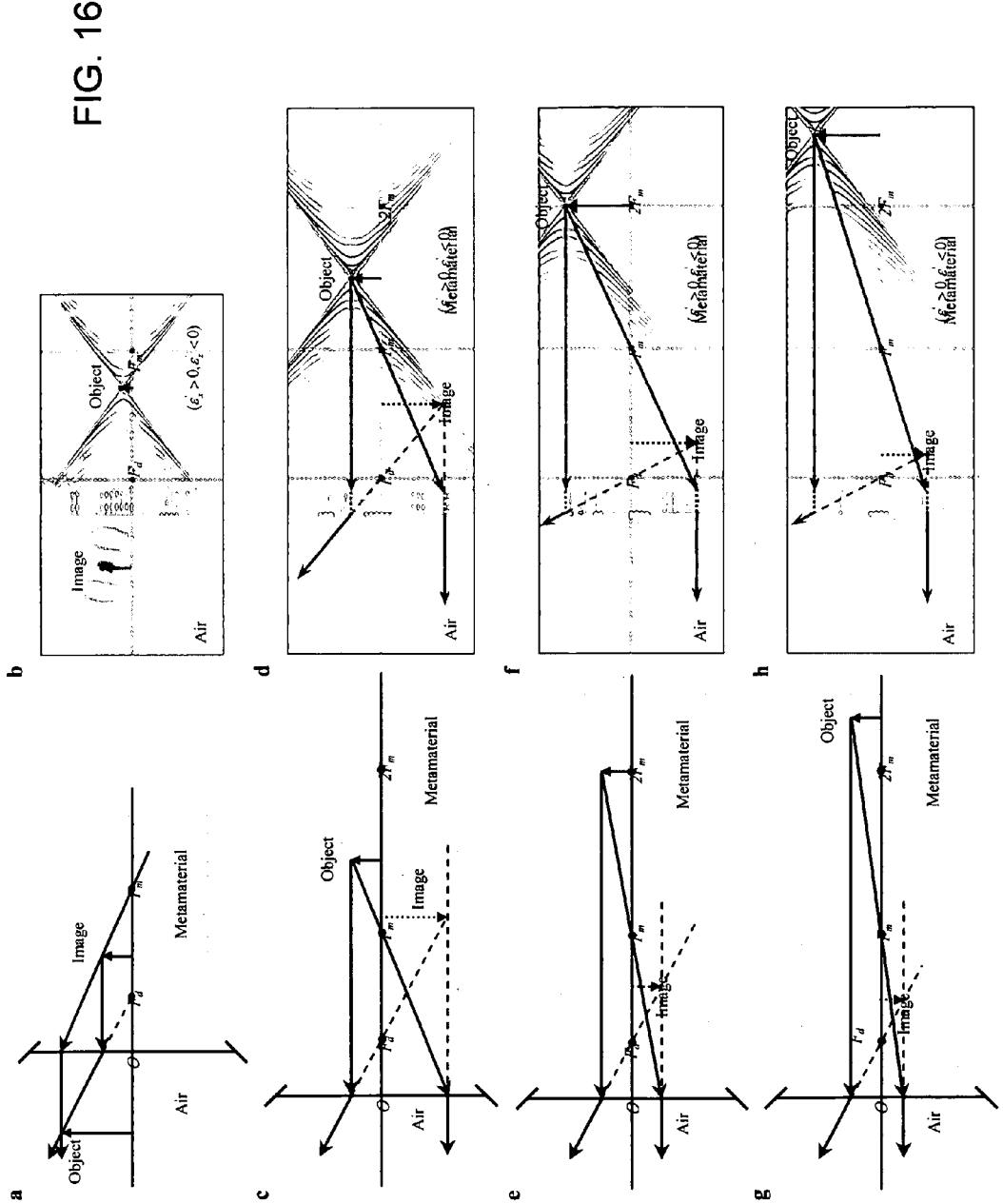

The simulations presented in FIGS. 14, 15 and 16 are based on one hyperbolic metalens design at the wavelength of 690 nm. The metamaterial has a hyperbolic dispersion with $\in_x=6.4+0.03$ i and $\in_z=-10.3+0.2$ i, which is designed using silver nanowires in a dielectric background with a refractive index 1.3 at the silver volume filling ratio p=0.5. The silver nanowires are orientated in the z direction. The PWC is a nanoscale silver waveguide array which includes 27 nanoscale slits arranged symmetrically with respect to the optical axis. The waveguides are uniformly distributed with a center-to-center spacing of 70 nm but are designed to have different widths (from edge to center of the plate: 16.6, 21.9, 30.0, 43.9, 13.2, 15.0, 16.9, 19.0, 21.2, 23.3, 25.2, 26.8, 27.8, 28.2 nm) and thus provide phase compensation for plane wave focusing to the metamaterial. The material in the slits has a refractive index 2.0 and the length of the waveguides is 300 nm. The permittivity of silver is −22.2+0.4 i.

This hyperbolic metalens has a focal length in the metamaterial $f_m=2.0$ μm. The calculated focal length for the air space is $f_d=-0.48$ μm.

Parameters for FIG. 15 below are as follows. The object in air is randomly chosen at ($u_d=0.4$ μm, $v_d=0.7$ μm), the minified real image is above $F_m$ at ($u_m=0.118$ μm, $v_m=1.46$ μm). Thus the transverse magnification is $M_T=u_m/u_d\approx0.3$ for this case, which is close to the calculated magnification 0.4.

Parameters for FIG. 16 are as follows. FIG. 16a is the reciprocal of FIG. 15, so the object is at ($u_m=0.118$ μm, $v_m=1.46$ μm) in the metamaterial. The object in FIG. 16d is at ($u_m=0.4$ μm, $v_m=3.0$ μm). The object in FIG. 16f is at ($u_m=0.9$ μm, $v_m=4.0$ μm). The object in FIG. 16h is at ($u_m=0.9$ μm, $v_m=5.0$ μm).

In the following sections, a hyperbolic metalens, which is one type of the phase compensated negative refraction lenses, is used as a specific example to illustrate metalens imaging. The process of designing such a hyperbolic metalens starts with focusing an incident plane wave from the air side, through phase compensation, to the focus $F_m$ at the focal length $f_n$, in the metamaterial, as shown in FIG. 14a. Due to the hyperbolic dispersion of the metalens, a plane wave comes from the metamaterial side, instead of being focused, will diverge after the metalens, resulting in a virtual focus at $F_d$ also in the metamaterial (see FIG. 14c). It is well known that a conventional converging lens that has two foci: one on each side; i.e., a plane wave coming from one side is focused to the other side, and vice versa. In stark contrast, a hyperbolic metalens works like a converging lens from one side but a diverging lens from the other.

Because of the hyperbolic dispersion, $\in'_z<0$, $f_d$ and $f_m$ have different signs: $f_m>0$, so $f_d<0$. Thus, the $F_d$ of a hyperbolic metalens is not in air but in the metamaterial. As is analyzed above, a hyperbolic metalens breaks the forward/backward symmetry preserved in common lenses, leading to exceptional focusing behaviors. As an example, imaging formation by a hyperbolic metalens designed with $f_m=2.0$ μm at the wavelength of 690 nm is described below. The metamaterial has a hyperbolic dispersion with $\in_x=6.4+0.03$ i and $\in_z=-10.3+0.2$ i.

FIG. 15a schematically depicts the imaging behavior of such a hyperbolic metalens for an object in air. Two characteristic rays can be used to determine the image: the one parallel to the optical axis is "refracted" toward the focus $F_m$ in the metamaterial; another one towards the focus $F_d$ is "refracted" to the direction parallel to the optical axis in the metamaterial. The crossing point of these two rays determines the location of the image. Particularly, in the case of an object in air, the image in the metamaterial is always minified, erect, real and within the first focal length, regardless of the distance of the object in air to the metalens. This is completely different from a conventional lens, in which the image properties are dependent on the position of the object. Another special ray, which is the one passing the optical center O, may also be used to determine the location of the image through the calculation of its refraction angle in the metamaterial $\theta_m\approx Re(\sqrt{\in_x/\in_z})\sin\theta_d$, with $\theta_d$ being the incident angle and $\theta_m$ being the refracted angle of that ray with respect to the optical axis. FIG. 15b shows the numerical verification for such a case using full wave simulation. Because the image can not go beyond the focal plane in the metamaterial space, the entire air space is mapped into the metamaterial space within the first focal plane.

Similarly, through schematic and geometric analysis, the image for an object in the metamaterial can be analyzed: the property of the image is dependent on the position of the object relative to the focus $f_m$. The image location can also be determined using characteristic rays: the one connecting the object and the focus $F_m$ is "refracted" to the direction parallel to the optical axis; another one parallel to the optical axis is "refracted" to the direction whose backward extension passes the focus $F_d$, because $F_d$ is not in air but in the metamaterial. FIG. 16a shows the imaging behavior of an object within the first focal length in the metamaterial, i.e., $v_m < f_m$: the image in air is always magnified, erect and real. The image is real because the "refracted" rays converge in air. This case is simply the reciprocal of the case shown in FIG. 15. When the object is outside the first focal length, i.e., $v_m > f_m$ the rays in air diverge, but their backward extensions converge into a point on the other side of the optical axis in the metamaterial space, thus the image is always virtual and inverted. Depending on the relative position of the object, the image may be different in size; when the object is outside the first but inside the second focal length, i.e., $f_m < v_m < 2f_m$, the image is magnified, as shown in FIG. 16c; when the object is at the second focal length, i.e., $v_m = 2f_m$, the image has the same size as the object, as shown in FIG. 16e; when the object is outside the second focal length, i.e., $v_m > 2f_m$, the image is minified, as shown in FIG. 16g. All of the four cases above for an object in the metamaterial are numerically verified, as shown in FIGS. 16b, 16d, 16f, 16h, respectively. These extraordinary properties of a hyperbolic metalens for an object in both air and the metamaterial are summarized in the following table.

TABLE 2

Imaging properties of a hyperbolic metalens, $f_m > 0$ and $f_d < 0$.

| Object Location | Image | | | |
|---|---|---|---|---|
| | Type | Location | Orientation | Relative size |
| $\infty > v_d > 0$ | Real | $0 < v_m < f_m$ | Erect | Minified |
| $\infty > v_m > 2f_m$ | Virtual | $2f_d < v_d < f_d$ | Inverted | Minified |
| $v_m = 2f_m$ | Virtual | $v_d = 2f_d$ | Inverted | Same size |
| $f_m < v_m < 2f_m$ | Virtual | $-\infty < v_d < 2f_d$ | Inverted | Magnified |
| $v_m = f_m$ | | $\pm\infty$ | | |
| $v_m < f_m$ | Real | $0 < v_d < \infty$ | Erect | Magnified |

Referring to FIGS. 15 and 16, the magnification of the metalens can also be determined analytically through the transverse magnification $M_T$ $$M_T = \frac{u_m}{u_d} = -\frac{g_m}{f_m} = -\frac{f_d}{g_d}$$

where $u_m$ and $u_d$ are the object/image height, i.e., the distance from the object/image to the optical axis, in the metamaterial and air space respectively; $g_m$ and $g_d$ are the object/image distance reckoned from their focus in the metamaterial and air space respectively.

Although illustrated using hyperbolic metalenses with $f_m > 0$, $f_m$ can also be designed to be negative ($f_m < 0$), meaning a plane wave from the air side diverges in the hyperbolically dispersive metamaterial. In this case, a plane wave from the metamaterial side will be focused in air, resulting in a positive $f_d$. The imaging properties of such a hyperbolic metalens with $f_m < 0$ are similar to those of the case of $f_m > 0$ but the air and metamaterial spaces are exchanged.

The new set of imaging properties in the exampled hyperbolic metalens are based on the hyperbolic dispersion of the metamaterials. The rules are applicable to other phase compensated lenses that experience negative refraction at the air/lens interface. These exotic imaging properties are absent in conventional lenses and can be used to extend the imaging properties and the capabilities of lenses in various applications.

Metalens designs described here can be used to construct a new type of metalenses that are phase compensated by the gradient index (GRIN) or inhomogeneous permittivity metamaterials. Both elliptically and hyperbolically dispersive GRIN metalenses for both internal and external focusing are possible and such GRIN metalenses can be used to achieve super resolution and have ordinary or extraordinary Fourier transform functions. Because the focus of a GRIN metalens can be either inside or outside the metamaterial and the metamaterial can be either elliptically or hyperbolically dispersive, there are four possible lens combinations, i.e., elliptic/hyperbolic GRIN metalenses for internal/external focusing.

It is well known that a conventional GRIN lens requires a symmetric refractive index profile with its maximum at the center for both internal and external focusing. The permittivity profiles ($\epsilon_x'$, $\epsilon_z'$) needed for a GRIN metalens however is not obvious due to the complexity resulting from the material anisotropy, and possible positive or negative refraction at lens/air interface.

Figure 17:
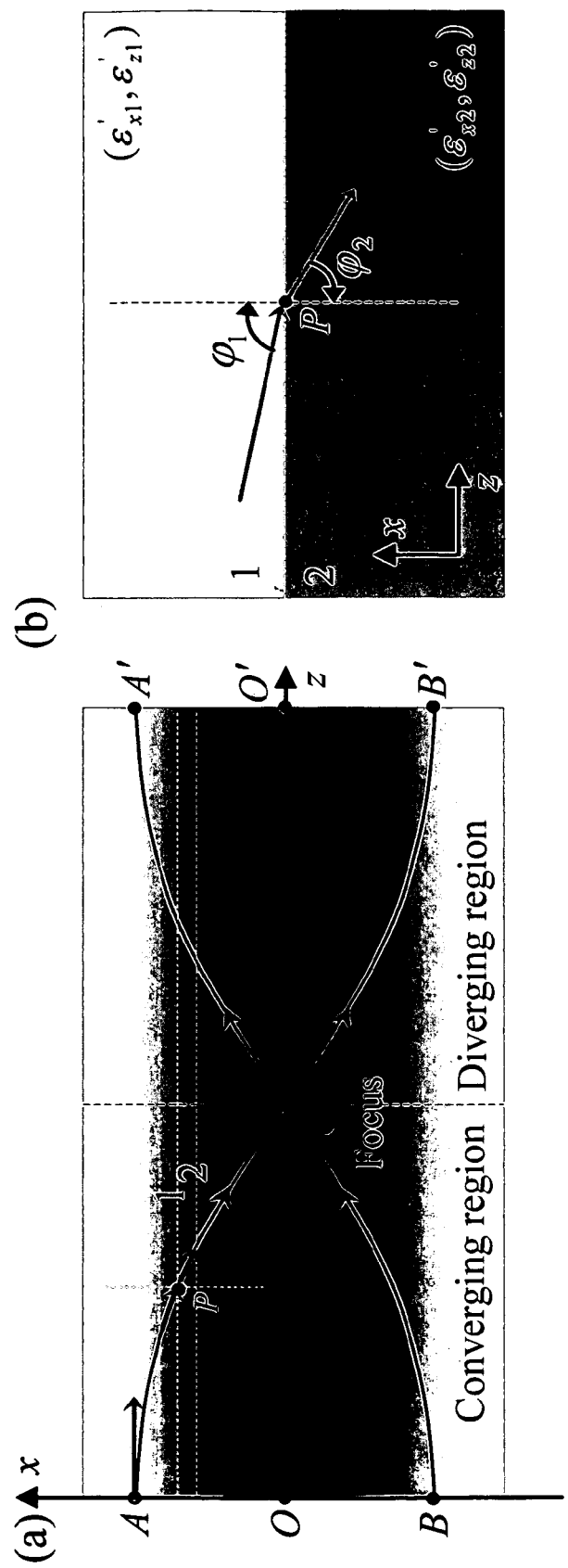
FIG. 17 shows (a) schematic ray model of a GRIN lens and its discretization in the x direction; and (b) a zoomed-in view at a point P on a ray in the converging region.

FIG. 17a shows the schematic one-period ray model of an internal focusing GRIN metalens. The period of the ray trajectory includes two characteristic regions, i.e., a converging region and a diverging region separated by the focus plane that is represented by the vertical dashed line through point C, as shown in FIG. 17a. The GRIN metalens can be modeled by discretizing the material into infinitesimally thin layers in the x direction, each of which may be considered as a uniform medium as shown in FIG. 17b at an arbitrary location P on the ray trajectory AC in the converging region. The lens focusing problem is now simplified into a refraction problem at the interface between two adjacent anisotropic media. Assuming the material property variation is small between layers and only normal refraction exists, it can be easily concluded that the refraction angle $\phi_2$ should be always less than the incident angle $\phi_1$ for all points on the ray trajectory before reaching the focus C. Giving anisotropic permittivities ($\epsilon_{x1}$, $\epsilon_{z1}$) and ($\epsilon_{x2}$, $\epsilon_{z2}$) to layers 1 and 2 respectively, the momentum conservation at the interface requires the following relation between $\phi_1$ and $\phi_2$, $$\frac{\epsilon_{z1}'}{\epsilon_{x1}'^2 \tan^2\varphi_1} + \frac{1}{\epsilon_{x1}'} = \frac{\epsilon_{z2}'}{\epsilon_{x2}'^2 \tan^2\varphi_2} + \frac{1}{\epsilon_{x2}'}$$

At point A, $\phi_1 = 90°$, the above relationship is reduced to $$\tan^2\varphi_2 = \frac{\epsilon_{x1}' \epsilon_{z2}'}{\epsilon_{x2}'(\epsilon_{x2}' - \epsilon_{x1}')}$$

In order to guarantee a solution of $\phi_2 < 90°$, the right hand side of the above relation needs to be larger than zero; thus the ray will be bent toward the optical axis (x=0). This indicates that $\epsilon_x$ cannot be a constant, as otherwise $\phi_2 = 90°$ and thus an incident plane wave will maintain its propagation direction without being altered to form a focus. Exemplary combinations of the symmetrical gradient profiles of $\epsilon'_x$ and $\epsilon'_z$ for the GRIN metalens to achieve internal focusing are summarized in Table 8 below.

TABLE 8

The conditions of symmetrical gradient anisotropic material properties for GRIN metalenses with internal and external focusing. Max and Min take the maximum and minimum, respectively; The dot atop $\epsilon'_x(x)$ and $\epsilon'_z(x)$ stands for the derivative with respect to x.

| Material properties | | | Requirements for gradient profile of | | Focus | |
|---|---|---|---|---|---|---|
| Dispersion | | $\epsilon'_x(x)$ | $\epsilon'_z(x)$ | $\epsilon'_x(x)$ | $\epsilon'_z(x)$ | Internal | External |
| Elliptic | I | >0 | >0 | Max[$\epsilon'_x(x)$] at x = 0 | (i) Min[$\epsilon'_z(x)$] at x = 0 <br> (ii) Max[$\epsilon'_z(x)$] at x = 0, $\epsilon'_z(x)/\epsilon'_{x(x)} < 2\epsilon'_z(x)/\epsilon'_x(x)$ | Yes | Yes, truncate in the converging region |
| Hyperbolic | II | >0 | <0 | Min[$\epsilon'_x(x)$] at x = 0 | Max[$\epsilon'_z(x)$] at x = 0, $\epsilon'_z(x)/\epsilon'_{x(x)} > 2\epsilon'_z(x)/\epsilon'_x(x)$ | Yes | Yes, truncate in the diverging region |
| | III | <0 | >0 | Max[$\epsilon'_x(x)$] at x = 0 | Min[$\epsilon'_z(x)$] at x = 0, $\epsilon'_z(x)/\epsilon'_{x(x)} < 2\epsilon'_z(x)/\epsilon'_x(x)$ | Yes | Yes, truncate in the diverging region |
| | IV | | | All others | | No | Yes |

If a GRIN metalens can focus inside the metamaterial, the outside focusing in air can be achieved by truncating the metamaterial in either the converging or diverging regions, which is determined by the positive or negative refraction experienced at the metamaterial/air interface. When the dispersion of the metamaterial is elliptic, the refraction at the metamaterial/air interface is positive, so the truncation should be in the converging region; on the contrary, when dispersion of the metamaterial is hyperbolic, the refraction at the metamaterial/air interface is negative, therefore the truncation should be in the diverging region. Another distinction between the hyperbolic and elliptic dispersions in GRIN metalenses is that a hyperbolically dispersive metamaterial with gradient $\epsilon'_x$ and $\epsilon'_z$ profiles that lead to internal divergence (no internal focus) still can bring light into an external focus through the negative refraction at the interface. External focusing configurations are also included in the above Table 8.

A $\epsilon'_z$ profile with a maximum at the center in case I-(ii) does not always result in internal focusing. Additional restriction $$\dot{\epsilon}_z(x)/\dot{\epsilon}_x(x) < 2\epsilon_z(x)/\epsilon_x(x)$$

to the permittivity profiles, with the dot representing the derivative with respect to x, needs to be satisfied to guarantee the internal focusing. Because $\epsilon'_x > 0$ and its maximum is at the center, $\epsilon'_{x2} > \epsilon'_{x1}$ and $1/\epsilon'_{x2} < \epsilon'_{x1}$, the following can be obtained:

$$\frac{\varepsilon'_{z1}}{\varepsilon'^2_{x1}\tan^2\varphi_1} < \frac{\varepsilon'_{z2}}{\varepsilon'^2_{x2}\tan^2\varphi_2}$$

Because of the opposite monotonic property of $1/\epsilon'_x(x)$ and $\epsilon'_z(x)$ in the positive or negative x regions, $$\frac{\varepsilon'_{z1}}{\varepsilon'^2_{x1}} > \frac{\varepsilon'_{z2}}{\varepsilon'^2_{x2}}$$

is required to ensure $\phi_2 < \phi_1$. The conventional GRIN lens is a subset of case I-(ii), with $\epsilon'_x = \epsilon'_z > 0$.

The above Table 8 provides general guidance for choosing metamaterials in designing GRIN metalenses. One approach for designing a GRIN metalens is that the type of the gradient profile of $\epsilon'_x$ should be looked after first. Once the $\epsilon'_x$ is chosen for the desired focusing behavior, the $\epsilon'_z$ profile is then determined by a specific metamaterial system. In the following, we illustrate the analyses above for both internal and external focusing GRIN metalenses with cases I-(i), II and a case in IV, which represent elliptic and hyperbolic internal focusing GRIN metalenses, and a hyperbolic metalens with only external focusing, respectively, using multilayer and nanowire metamaterials. Note that we exclude cases I-(ii), and III in the demonstration, because case I-(ii) is usually in the resonance regime and thus practically highly lossy; the type of metamaterials with ($\epsilon'_x < 0$, $\epsilon'_z > 0$) in cases III cannot support light propagation with wavevectors less than certain cut-off value.

Figure 18:
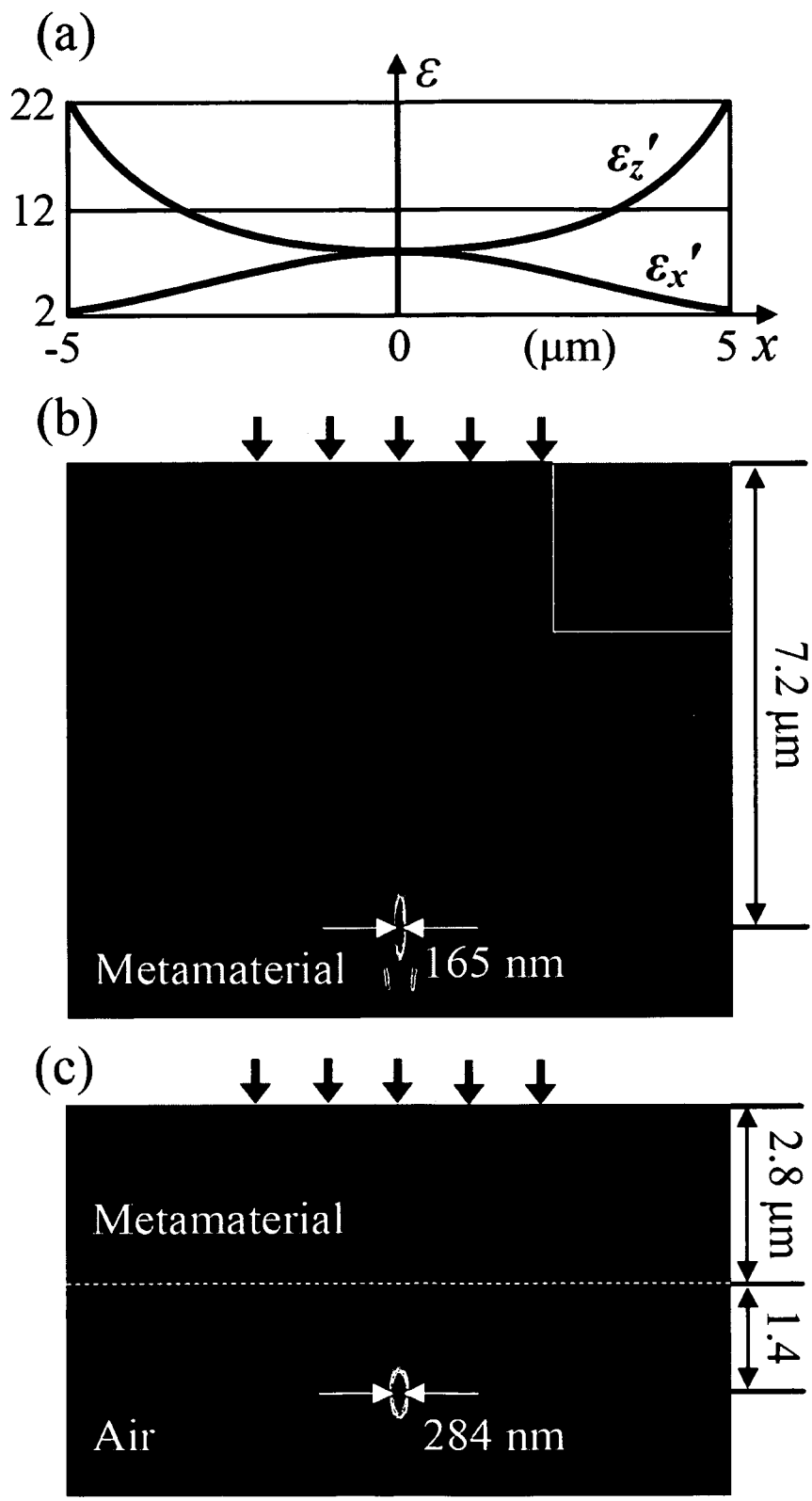
FIG. 18 shows (a) Permittivity profiles of an elliptic GRIN metalens designed using multilayers of alternating silver (in gray) and $TiO_2$ (in yellow) with the thickness of silver varying symmetrically from the center to the edges. The silver filing ratio ranges gradually from 0 at the center to 20% at both edges. Simulated electrical intensity (x component) distribution for (b) internal and (c) external focusing. $\lambda$=660 nm.

FIG. 18 shows an elliptic GRIN metalens with both internal and external focusing corresponding to case I-(i) in the above Table 8. The permittivity profiles of an elliptic GRIN metalens for both internal and external focusing are the same and these two types of lenses have different lengths. The elliptic GRIN metalens is designed using multilayers of alternating silver/TiO$_2$ at the wavelength of 660 nm. The multilayers are orientated in the transverse (x) direction and the thickness of silver and thus the silver filling ratio varies symmetrically from x=0 to the edges, as is schematically shown in the inset of FIG. 18(b). The permittivity profiles of the metalens are shown in FIG. 18(a), of which $\epsilon_x'$ is a squared hyperbolic secant profile, which is used thereafter for all the other simulations. The material properties of silver and TiO$_2$, and all the other materials used thereafter as well.

FIG. 18(b) shows the simulation of this elliptic GRIN metalens for internal focusing. When it's truncated shorter, i.e., in the converging region as noted in Table 8, an external focus is attained, for which the simulation is shown in FIG. 18(c). The resolution of the focus inside the metamaterial in FIG. 18(b) is about 165 nm (~$\lambda/4$), measured using the full width at half maximum (FWHM), which is more affected by the local $\epsilon_z$ at the center in the way up to $\lambda/(2\sqrt{\epsilon_z})$. The resolution of the focus outside the metamaterial in air shown in FIG. 18(c) is about 284 nm (~$\lambda/2.3$).

Figure 19:
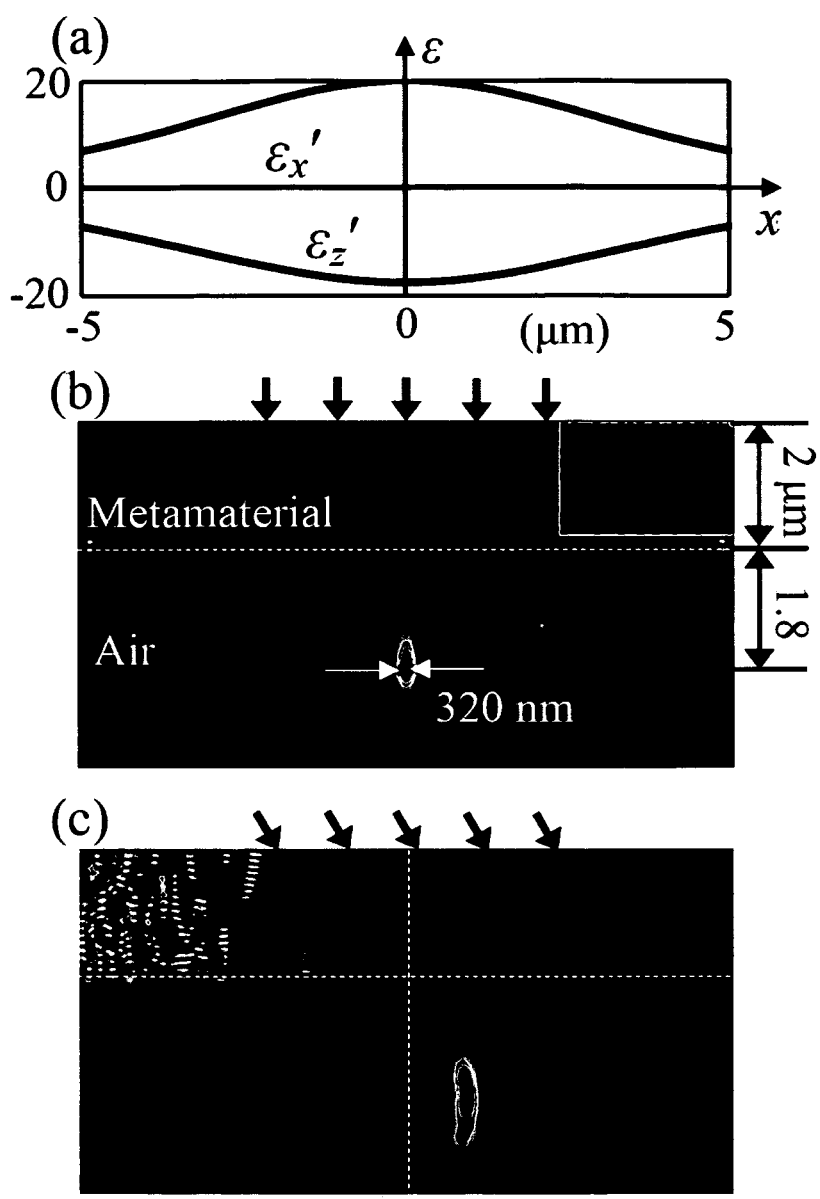
FIG. 19 shows (a) Permittivity profiles of a hyperbolic GRIN metalens that has only external focusing, designed using silver (in gray) nanowires in an alumina (in yellow) background. The volume filling ratio of silver varies symmetrically from 60% at the center to 30% at the edges. Simulated electrical intensity (x component) distribution for (b) normal and (c) tilted incident plane wave. $\lambda$=830 nm.

The diverging rays in a hyperbolic GRIN metalens can achieve external focusing due to the negative refraction at the interface of metamaterial/air. FIG. 19 shows such a hyperbolic GRIN metalens that only has an external focus, which is one of the "All others" cases in category IV in the above Table 8. An incident normal plane wave is always diverged by such a hyperbolic metamaterial; no internal focus is formed. The metalens is designed using a metamaterial of silver nanowires oriented vertically in an alumina background, as is schematically shown in the inset of FIG. 19(*b*), of which the permittivity profiles are shown in FIG. 19(*a*).

FIG. 19(*b*) shows the simulation of this hyperbolic GRIN metalens illuminated with a normal plane wave at the wavelength of 830 nm; a focus in air is formed with a linewidth of about 320 nm (~λ/2.6). In the examples of MIL and PWC based metalens designs, the hyperbolic metalenses show an abnormal focus shifting behavior that is opposite to that in a conventional lens when the incident plane wave is tilted. The focus shifting behavior in air of this hyperbolic GRIN metalens is normal for tilted incident beam, as shown in FIG. 19(*c*), which is a result of the double negative refraction at the input and output metamaterial/air interfaces.

The above exemplary hyperbolic GRIN metalens is designed for external focusing. A hyperbolic GRIN metalens may be designed to have both internal and external focusing.

Figure 20:
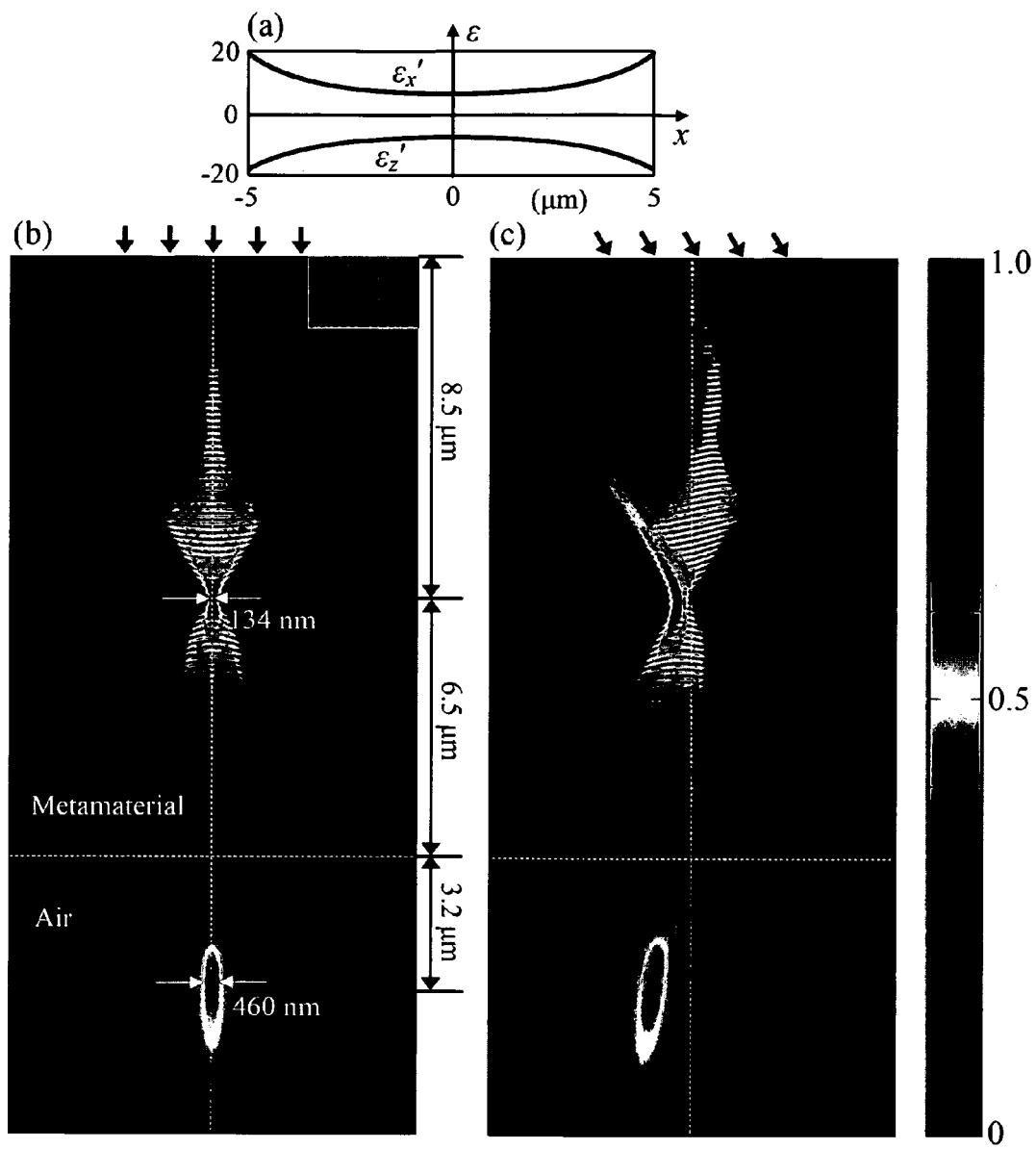
FIG. 20 shows (a) Permittivity profiles of a hyperbolic GRIN metalens that has both internal and external focusing, designed using silver (in gray) nanowires in an alumina (in yellow) background. The volume filling ratio of silver varies symmetrically from 30% at the center to 60% at the edges. Simulated electrical intensity (x component) distribution for (b) normal and (c) tilted incident plane wave. $\lambda$=830 nm.

FIG. 20 shows the permittivity profiles and the simulations of such a hyperbolic GRIN metalens in the category of case II in the above Table 8. The metamaterial is designed using silver nanowires oriented vertically in an alumina background at the wavelength of 830 nm, of which the permittivity profiles are shown in FIG. 20(*a*). Because a normal incident plan wave is converged by these permittivity profiles to form an internal focus, when it is truncated at the diverging region, an external focus can also be formed due to the negative refraction at the metamaterial/air interface, as is shown by the simulation in FIG. 20(*b*). When the incident beam is tilted, similar to the metalens and the MIL with a hyperbolically dispersive metamaterial, the internal focus of the hyperbolic GRIN metalens is shifted anomalously to the side that is opposite to that in a conventional lens, as shown in FIG. 20(*c*), demonstrating its extraordinary Fourier transform function. The external focus is also shifted abnormally to the same side as the internal focus. The external focus is not directly formed by converging the incident plane wave, but a self-image of the internal focus, which explains the abnormal shifting originating from the hyperbolic dispersion. The resolution of the internal focus shown in FIG. 20(*b*) is about 134 nm (~λ/6.2).

The three representative simulations above verify the theoretical analysis for possible gradient material property combinations that may result in internal and/or external focusing summarized in the above Table 8, which provides guidance for choosing metamaterials in designing GRIN metalenses. As shown by the simulations above, both elliptically and hyperbolically dispersive metamaterials with gradually varying permittivities can focus plane waves. The foci outside the GRIN metalenses in air shown in the above examples are close to or even smaller than λ/2. Both the elliptically and hyperbolically GRIN metalenses can achieve resolution far beyond the diffraction limit inside the metamaterial. As mentioned above, the ability of elliptically dispersive GRIN metalens to achieve high resolution inside focusing is limited because its $\in_z'(0)$ is the minimum and thus larger $\in_z'$S are not fully utilized. Although the $|\in_z'(x)|$ of a hyperbolically dispersive GRIN metalens has its minimum at x=0, its transverse wavevector coverage is theoretically unlimited, which may result in much higher resolution; the practical resolution may be determined by the feature size and loss of the fabricated metamaterials.

Figure 21:
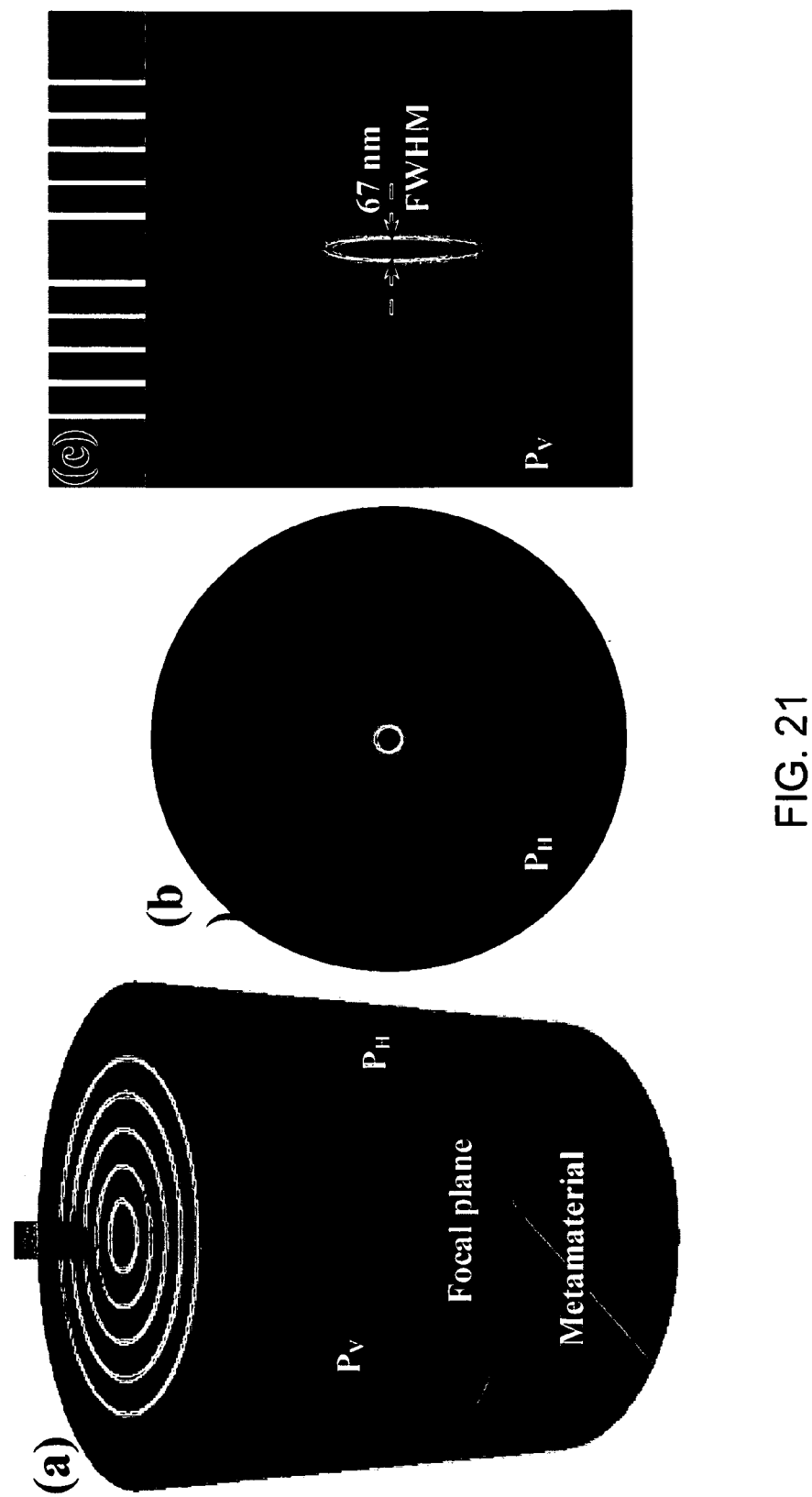
FIG. 21 shows an example of a 3D metalens: (a) Schematic geometry; (b) Power profile at the focal plane $P_H$, and (c) Power profile at a central vertical plane $P_V$, attaining a symmetric focused light spot with an FWHM of 67 nm.

The above lens designs for metalenses can be used to design and construct three dimension (3D) metalenses. As an example, FIG. 21 shows the schematic geometry and simulations for a 3D metalens. This 3D metalens includes a silver PWC with five annular slits forming slit cylinders in the metal layer on the top and a metamaterial slab with an elliptic dispersion on the bottom. The focal length of 3D metalens is 0.5 um in the metamaterial. FIGS. 21(*b*) and 21(*c*) show the simulated power profile at the focal plane $P_H$ and a central vertical plane $P_v$ respectively. With an illumination of a circularly polarized normal plane wave at the wavelength of 365 nm, a symmetric focused light spot with an FWHM of 67 nm is achieved. The parameters of this exemplary 3D metalens are: diameter=1.0 um, height of PWC=0.2 um and height of metamaterial slab=1.0 um. The designed focal length in metamaterial f=0.5 um. The metalens is illuminated by a circularly polarized normal plane wave at the wavelength of 365 nm. The width of the slits varies from 10 to 20 nm. The metamaterial slab has an elliptic dispersion ($\in_{xy}$=3.4−0.05 i, $\in_z$=11.3−0.9 i).

Metamaterial immersion lenses can be made by shaping plasmonic metamaterials. The convex and concave shapes for the elliptically and hyperbolically dispersive metamaterials are designed by using phase compensation. Numerical simulations verify that the metamaterial immersion lenses possess exceptionally large effective numerical apertures thus can achieve deep subwavelength resolution focusing.

Many efforts have been taken to increase the NA by introducing various high index materials such as solid immersion lenses (SIL) and NA increasing lenses (NAIL). Immersion lenses based on metamaterials, i.e., metamaterial immersion lens (MIL), can be constructed to achieve super resolution and integrated with various optical devices including conventional optical systems.

It is known that only the light from a point source within a small cone inside a high-index flat slab can transmit to air. The light outside that light cone will be totally reflected. A metamaterial slab can be designed to cover high k-vectors to generate such a small light cone. In the examples below, the interface of a metamaterial is shaped to achieve the bidirectional coupling between the metamaterial and air with well designed phase compensation. Such MIL possesses high resolving power.

The idea may be illustrated with a two-dimensional (2D) highly anisotropic metamaterial, which may have either elliptic ($\in_x'>0$, $\in_z'>0$) or hyperbolic ($\in_x'>0$, $\in_z'<0$) dispersion. Here $\in_x'$ and $\in_z'$ are the real part of the permittivity of the metamaterial in the x and z directions, respectively. The wavefront of a line light source inside such a metamaterial slab may be either convex for elliptic dispersion or concave for hyperbolic dispersion. Accordingly, a metamaterial may be shaped to have either a convex surface for elliptic dispersion or a concave surface for hyperbolic dispersion to achieve the coupling and phase compensation, due to the similarity between the interface shape and the dispersion curve of the metamaterial.

Figure 22:
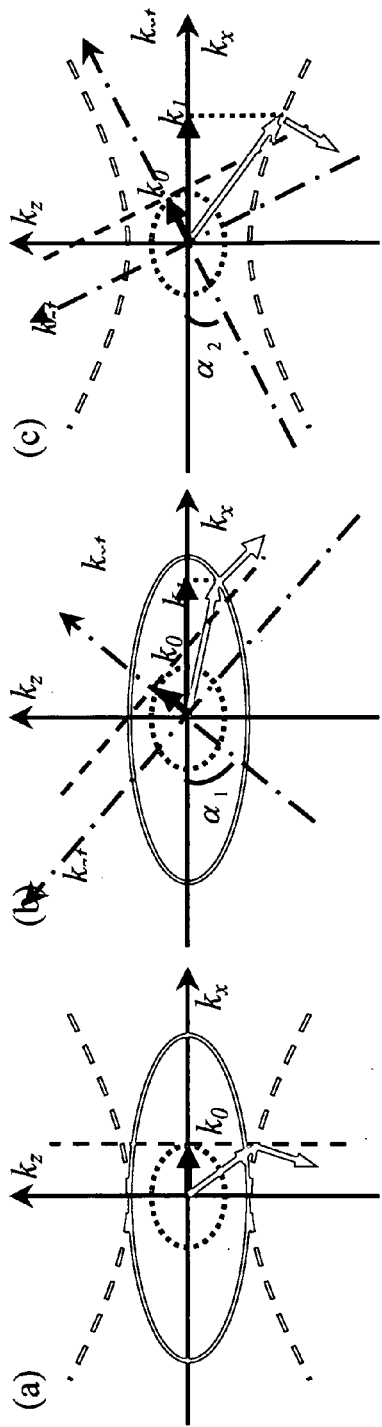
FIG. 22 shows equifrequency curves (EFCs) of air (dotted blue circle) and the metamaterials with an elliptic (solid red ellipse) and a hyperbolic (dashed red hyperbola) dispersion, respectively. (a) The interface of the metamaterials is a straight line along the $k_x$ direction; (b) The interface of the metamaterial with an elliptic dispersion has an angle $\alpha_1$ with respect to the $k_x$ axis; (c) The interface of the metamaterial with an hyperbolic dispersion has an angle $\alpha_2$ with respect to the $k_x$ axis. That is, the $k_{xt}$ axis is the interface in both (b) and (c).

FIG. 22 shows the dispersion curves (Equifrequency curves, EFCs) of air and the metamaterials. Let us assume that the principle axes of the metamaterials are always along the horizontal ($k_x$) and vertical ($k_z$) directions. When the interface of the metamaterial is along the $k_x$ axis, only the incident light within a small light cone with the transverse k-vectors less than $k_0$ can transmit into and out of the metamaterial, as shown in FIG. 22(*a*). FIGS. 22(*b*) and 22(*c*) show that the transverse k-vector coverage can be enlarged from $k_0$ to $k_1$ when the interface of the metamaterial ($k_{xt}$ axis) has an angle with respect to the material principle axes. Each point on the curved interface of the metamaterial may be considered having an interface not in the x axis direction, thus the transverse k-vector coverage can be extended by a curved interface. As shown in FIGS. 22(*b*) and 22(*c*), the extended wavevector coverage $k_1$ can be much larger than $k_0$ and even the highest achievable k-vectors in natural or synthetic optical materials for SIL, so super resolution can be achieved. In the following, we demonstrate the MIL concept with both elliptic (referred to as an elliptic MIL) and hyperbolic (referred to as a hyperbolic MIL) dispersions based on phase compensation for focusing in the metamaterials and numerically verify the analysis and designs.

Figure 23:
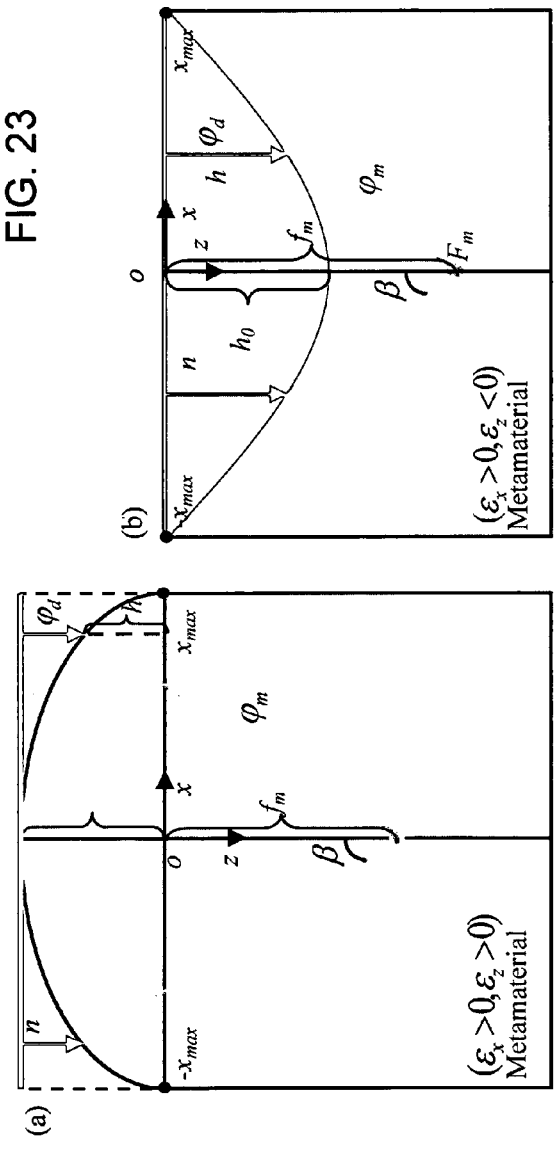
FIGS. 23, 24 and 25 show examples of metalens immersion lens (MIL) designs.

As illustrated in FIG. 23, an optical lens in MIL configuration can include an optical metamaterial structure comprising nano structures of metallic and dielectric materials and structured to include a slab portion and a curved portion connected to the slab portion and the curved portion includes a curved surface to effectuate an optical lens with a focus point within the optical metamaterial structure. The curved surface is a concave surface or a convex surface depending on the dispersive property of the metamaterial structure.

FIG. 23(a) shows the schematics of an elliptic MIL. Assuming designing an elliptic MIL with a focal length of $f_m$ and $x \in [-x_{max}, x_{max}]$. When a plane wave is incident on the MIL from the top, then refracted by the interface curve and focused to $F_m$. Phase condition for constructive interference at $F_m$ results in the following quadratic equation $$k_0(h_0 n + \sqrt{\in'_x f_m^2 + \in'_z x_{max}^2}) = k_0[(h_0 - h)n + \sqrt{\in'_x (f_m + h)^2 \in'_z x^2}]$$

Therefore, $$h(x) = (-b + \sqrt{b^2 - 4ac})/(2a)$$

where $a = \in'_x - n^2$, $b = 2 f_m \in'_x - 2n \sqrt{\in'_x f_m^2 + \in'_z x_{max}^2}$, $c = \in'_z (x^2 - x_{max}^2)$ and $k_0$ being the wavevector in free space. Changing $\in'_z$ to be negative results in the formulas for the hyperbolic MIL, with $x_{max} < f_m \tan \beta$ and $\tan \beta = \sqrt{\in'_x / \in'_z}$. The sign change of $\in'_z$ for the hyperbolic MIL case can be easily verified using the schematic of the hyperbolic MIL in FIG. 23(b). If measured from the apex of the curved interfaces, then the focal lengths are $f = (f_m + h_0)$, with $h_0$ is positive for the elliptic MIL and negative for the hyperbolic MIL.

Simulations have been carried out to verify the analysis above for both cases at the wavelength of 633 nm. FIG. 24(a) shows the simulated power profile of an elliptic MIL with a normal incidence of plane wave. The permittivity of the elliptic metamaterial is $\in_x = 5.1 + 0.1$ i and $\in_z = 16.0 + 0.08$ i, which is designed using an alternate multilayer of silver and Gallium Phosphide with a volume filing factor of silver to the metamaterial of p=0.2. The multiple layers of the metamaterial lay in the x direction in the MIL. The focal length of the elliptic MIL is $f_m = 3$ um and $x_{max} = 3.4$ um, and the calculated $h_0 = 6.7$ um. This elliptic MIL achieved a focus with an FWHM (full width at half maximum) of 70 nm (~λ/9) for the normal plane wave incidence, which is equivalent to an effective NA of 4.5.

When the incident light is tilted, the focus will be shifted accordingly. The shift may be estimated by $$\Delta x = Re(f \sqrt{\in_x / \in_z} \sqrt{\in'_z - \sin^2 \theta} \sin \theta)$$

where θ is the incident angle with respect to the z axis and Re denotes the real part. In practical designing, $|\in'_z| \gg \sin^2 \theta$, so the following can be obtained $$\Delta x \approx Re(f \sqrt{\in_x / \in_z} \sin \theta)$$

The simulation in FIG. 24(b) shows a shift of Δx=310 nm for θ=14 degrees, which is comparable to the calculated shift Δx=331 nm.

The elliptic MIL above has shown its unprecedented high resolution performance over conventional homogeneous SILs, due to its high optical anisotropy. The hyperbolic MIL may behaves differently due to the negative $\in'_z$.

FIG. 25(a) shows the simulated power profile of a hyperbolic MIL with a normal incidence of plane wave. The permittivity of the elliptic metamaterial is $\in_x = 8.1 + 0.1$ i and $\in_z = -12.5 + 0.3$ i, which is designed using silver nanowires in air background with a silver volume filing factor of p=0.7. The silver nanowires of the metamaterial are aligned in the z direction. The focal length of the elliptic MIL is $f_m = 2$ um and $x_{max} = 1.29$ um, and the calculated $h_0 = -1.23$ um. This hyperbolic MIL achieved a focus with an FWHM of 66 nm λ/9.6) for the normal plane wave incidence, which is equivalent to an effective NA of 4.8. As in the elliptic MIL, when the incident light is tilted, the focus will be shifted. The simulation in FIG. 25(b) shows a shift of Δx=−120 nm for θ=37.8 degrees to the opposite side to the elliptic MIL. This shift is also comparable to the calculated shift Δx=−108 nm.

Figure 24:
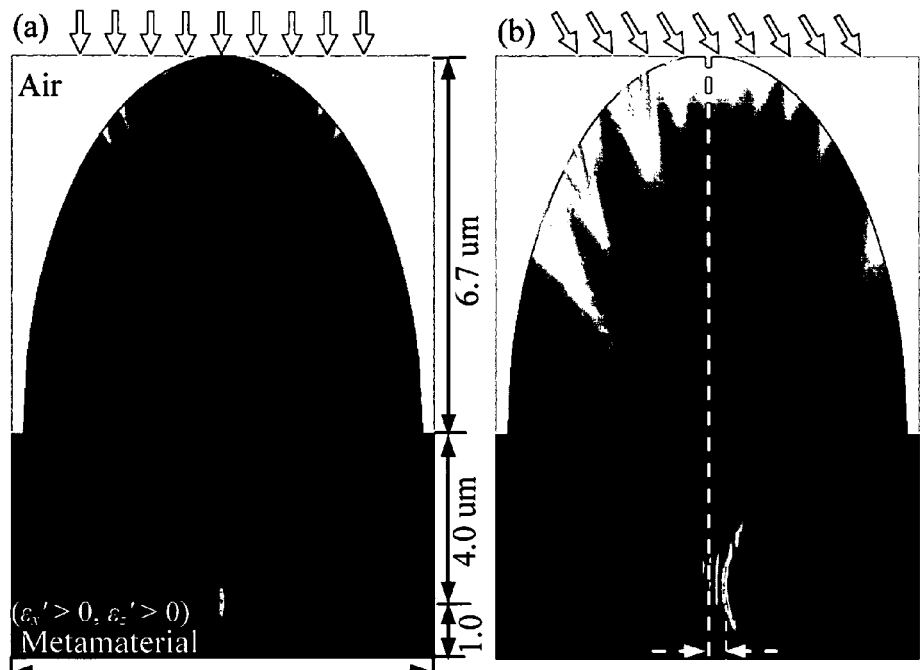
Figure 25:
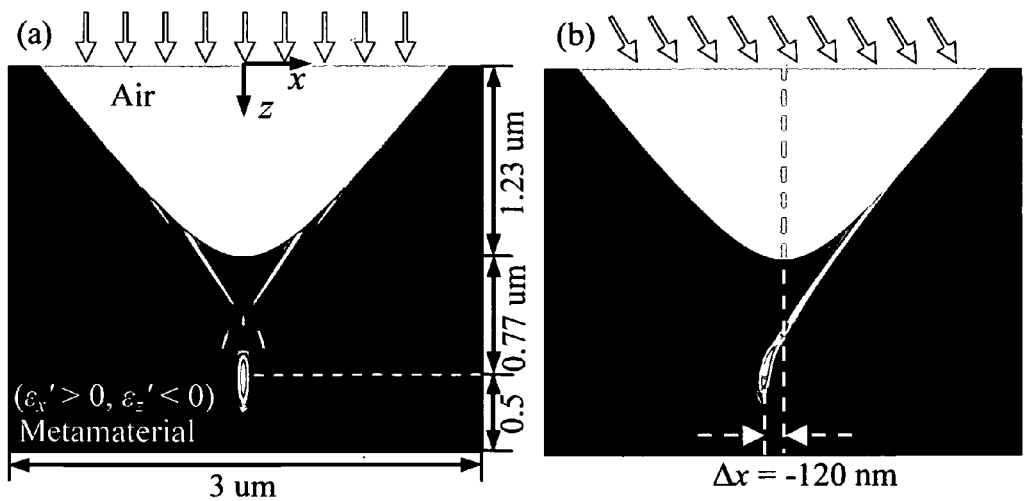

As is demonstrated above, the elliptic and hyperbolic MILs can achieve super resolution with convex and concave interfaces, respectively. A hyperbolic MIL can achieve focusing by a concave interface, which is exceptional and not achievable in conventional optics. With the designed curved interfaces, waves with high transverse k-vectors can be coupled into the metamaterial with compensated phase and thus can be focused into deep subwavelength scale. Notice that the concave interface of the hyperbolic MIL in FIG. 25 is flatter than that of the elliptic MIL in FIG. 24. This is due to the higher anisotropy, i.e., $|\in'_z|/\in'_x$, of the elliptic MIL than the hyperbolic MIL. Although both types of MIL can achieve super resolution, the hyperbolic MIL shows anomalous imaging behavior. The opposite displacement of the focus with respect to the incident light is of special interest. This opens up new possibilities to design lens system with extraordinary functionalities and performances.

Factors that can affect the achievable resolution of the MILs include: (i) the intrinsic material properties of the metamaterial. i.e. the k-vector coverage determined by the dispersion relation $k_z^2/\in_x + k_x^2/\in_z = k_0^2$ of the metamaterials, and (ii) the losses, including propagation and coupling losses, which may strongly modulate the optical transfer function (OTF) of the MILs. The dispersion relation imposes a theoretical cutoff on the coverage of $k_x$, which limits $k_x$ up to Re($\sqrt{\in_z} k_0$), for an elliptically dispersive metamaterial. On the other hand, the $k_x$ has no limit in the dispersion relation of a hyperbolically dispersive metamaterial. The losses can also play a role in the performance of the MILs. Different k-vectors may have different loss coefficients and propagation lengths in an MIL, thus the k-vectors attenuate differently. Furthermore, the curved shapes of the MILs cause different refraction (coupling) efficiencies at different positions due to the different angles of incidence. The k-vector spectrum at the focus of an MIL may be significantly modulated by both the propagation and coupling losses and thus substantially different from that of a conventional SIL. The presented elliptic MIL achieved an effective NA of 4.5, which is even a little larger than Re(g), i.e., 4.0. As shown in FIG. 24, the low transverse k-vectors in the center part propagate longer distances to the focus than the high k-vectors on the edge parts, so the low k-vectors attenuates more than the high k-vectors. Although the coupling efficiencies of at the center part in FIG. 24 are higher than on the edge parts for normal incidence, the coupling loss profile that makes the OTF is overwhelmed by the propagation losses.

Therefore, the overall OTF of the elliptical MIL indicates more transmission for higher k-vector waves, finally resulting in higher resolution focus and a higher effective NA. In principle, $k_x$'s of a hyperbolic MIL can be infinitely large as there is no cutoff in its dispersion relation, so extremely large effective NA's may be obtained. However, in practice, the chosen $x_{max}$ limits the coverage of $k_x$. In the presented hyperbolic MIL above, the maximum $k_x$ is $4.72k_0$. The loss mechanisms affect the performance of the hyperbolic MIL similarly as in the elliptic MIL, resulting in a higher NA of 4.8.

The metamaterials properties used in the examples above are real values based on the effective media estimation in 2D metal/dielectric multilayer composites and metallic nanowires in dielectric template at the visible wavelength of 633 nm. The elliptic and hyperbolic MIL concepts can be extended to three-dimensional (3D) devices and at other frequency bands, such as ultraviolet, infrared, terahertz, RF or microwave spectra. The same principle can also be applied to acoustics due to the nature of waves. The presented MILs have achieved super resolution and NAs. The ultimate limitation of MILs is not limited by these examples and can be designed to achieve much high NAs. A practical usage of the MIL is to make its bottom plane the focal plane so that the resulting near field can be used. As a result, the MIL can find extraordinary applications in lithography, imaging, scanning near-field microscope, sensing, optical storage and heat assisted magnetic recording, etc. As the MILs are typically in microscale, MILs can also be integrated with a flying head for high speed processing as in the flying plasmonic lens, and even an array of MILs can be designed for parallel processing.

The metamaterial-based lenses described in this document can be fabrication via various fabrication methods. FIGS. 26-32 illustrate examples of some fabrication methods and/or processes for fabricating the described metamaterial-based lenses.

Figure 26:
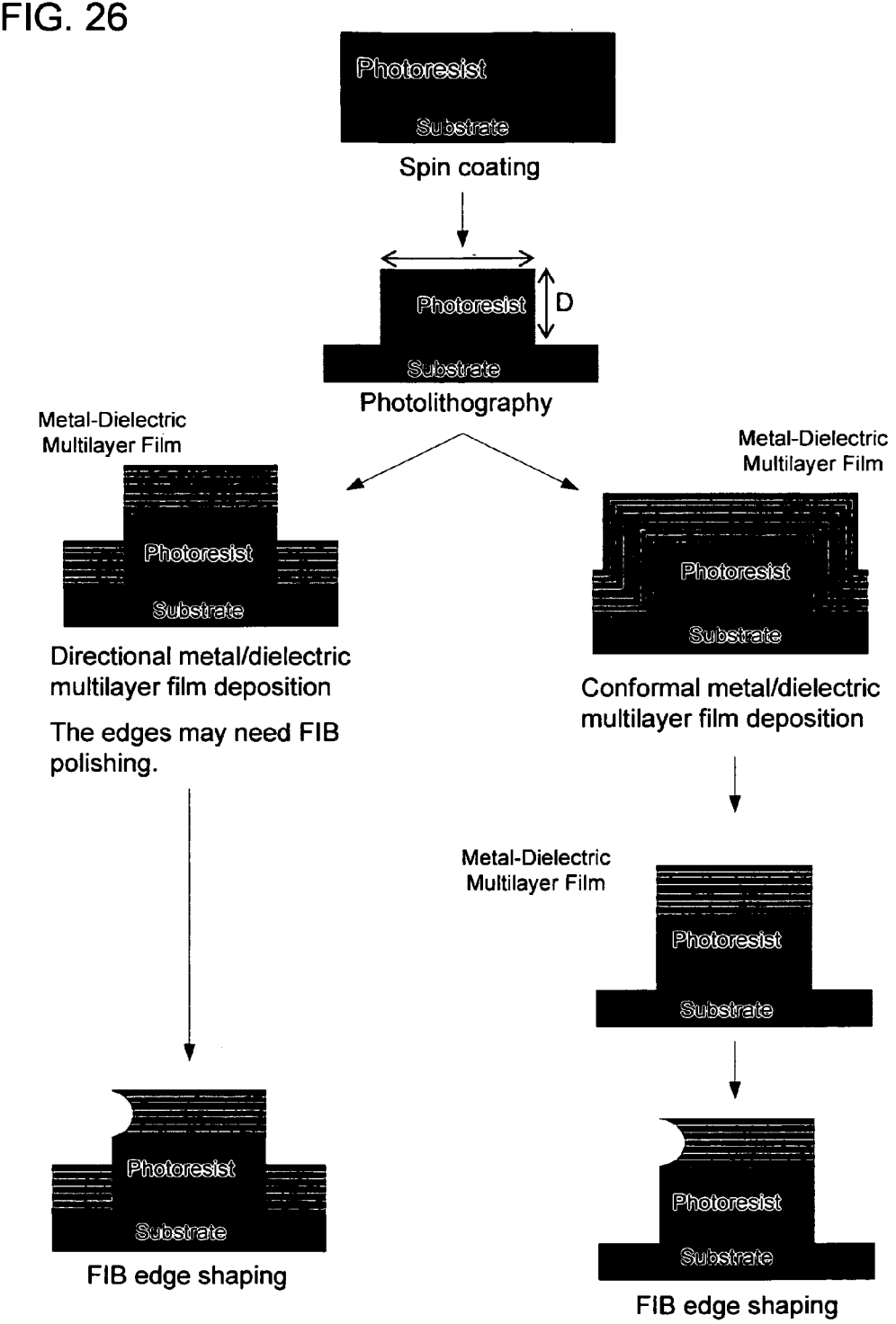

FIG. 26 shows an example of a process for fabricating a 2-dimensional GRIN metalens described above. First, a substrate is prepared and a photoresist layer is formed by spin coating or other deposition methods. Next, the photoresist layer is patterned by photolithography or other patterning techniques. Two alternative methods can be used to form the composite layers of metals and non-metal layers for the metamaterial structure of the metalens. In this example, alternating metal land dielectric layers are formed for the metamaterial structure.

In the first alternative process shown on the left side, a directional metal-dielectric multilayer film deposition is performed to form a metal-dielectric multilayer film over the top of the exposed photoresist surface and exposed surfaces of the substrate. Next, an edge shaping process, e.g., a focused ion beam (FIB) edge shaping, is performed to shape the edge of the metal-dielectric multilayer film on top of the photoresist for the GRIN metalens.

In the second alternative process shown on the right side, a conformal metal-dielectric multilayer film deposition is performed to form a metal-dielectric multilayer film over the top of the exposed photoresist surface and exposed surfaces of the substrate. Next, the film formed on the side walls of the photoresist and the exposed, photoresist-free surfaces of the substrate are removed to leave only the film on top of the photoresist. Next, an edge shaping process, e.g., a focused ion beam (FIB) edge shaping, is performed to shape the edge of the metal-dielectric multilayer film on top of the photoresist for the GRIN metalens.

Figure 27:
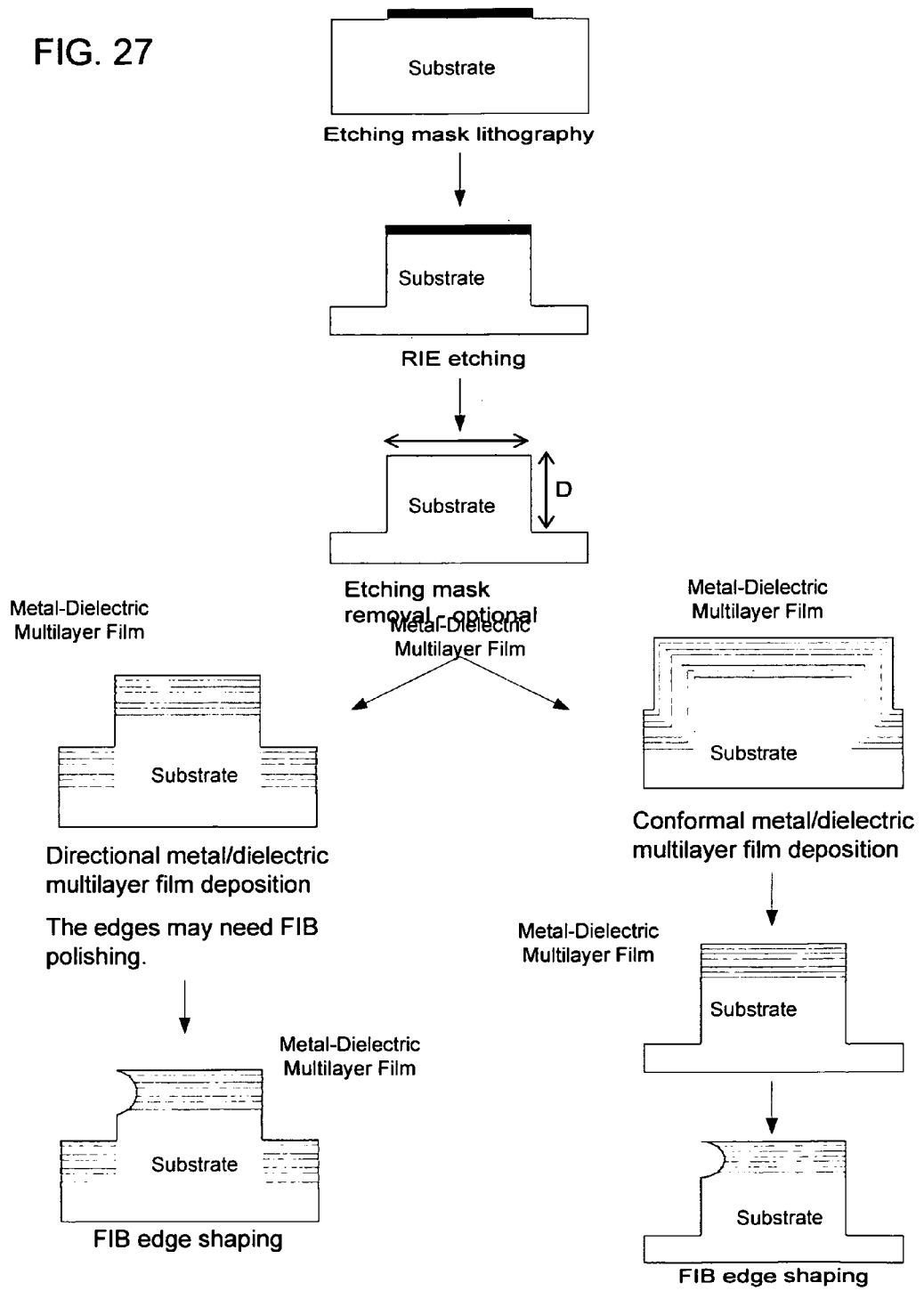

FIG. 27 shows another GRIN metalens fabrication method based on etching mask lithography where a patterned mask is formed to pattern the substrate and an optional RIE etching is then performed to remove the mask after the patterning. Next, the film deposition and subsequent processing as in FIG. 26 are performed to complete the fabrication of the GRIN metalens.

Figure 28:
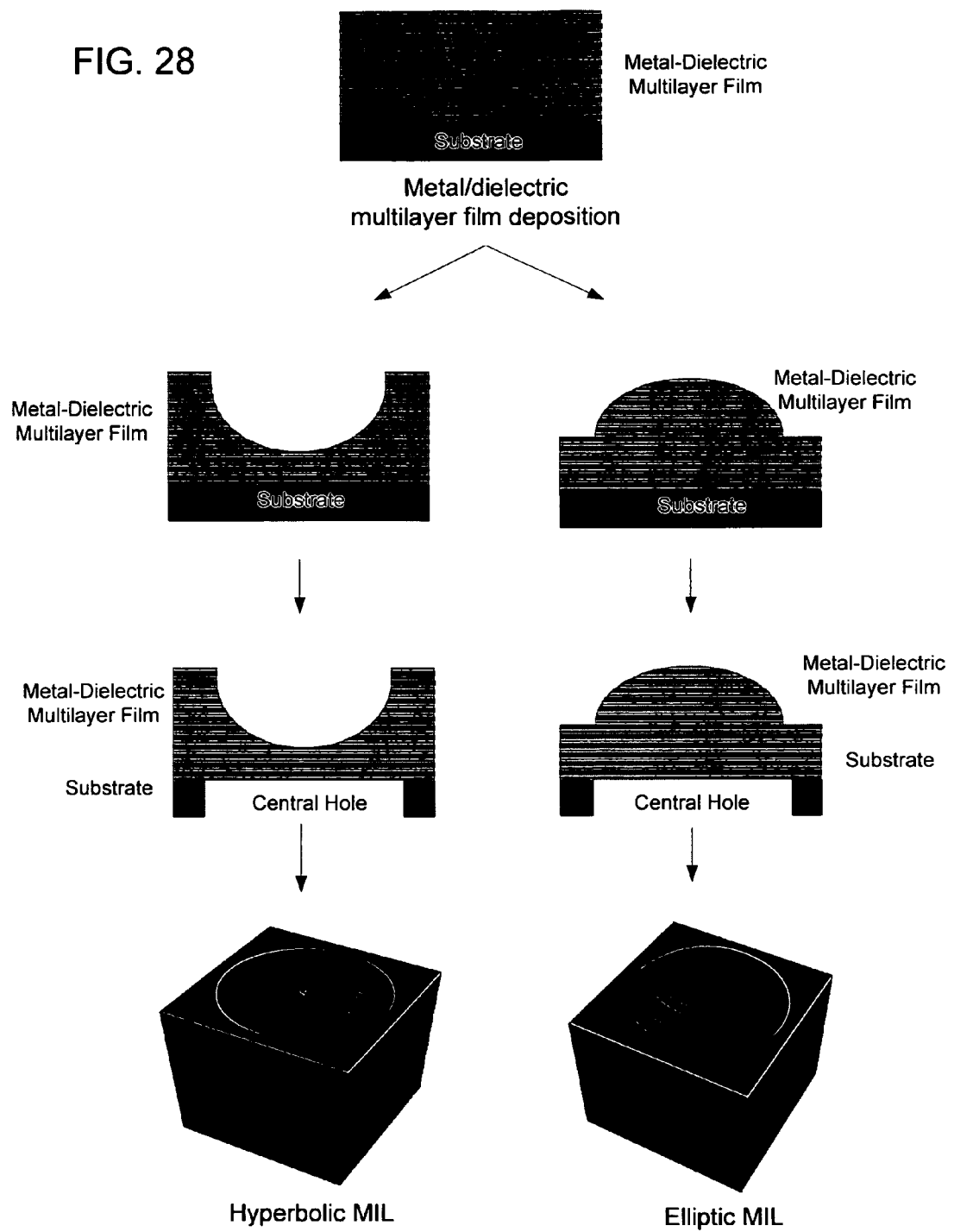

FIG. 28 shows an example of fabrication of a 3D planar multiplayer based MIL. First, a metal-dielectric multilayer film over the top of the exposed photoresist surface. Next, a shaping process, e.g., a focused ion beam (FIB) shaping, is performed to shape the metal-dielectric multilayer film on top of the photoresist for the GRIN metalens based on the dispersion and the specific design of the lens. Next, back etching is performed to remove central portion of a non-transparent substrate to form the 3D MIL.

Figure 29:
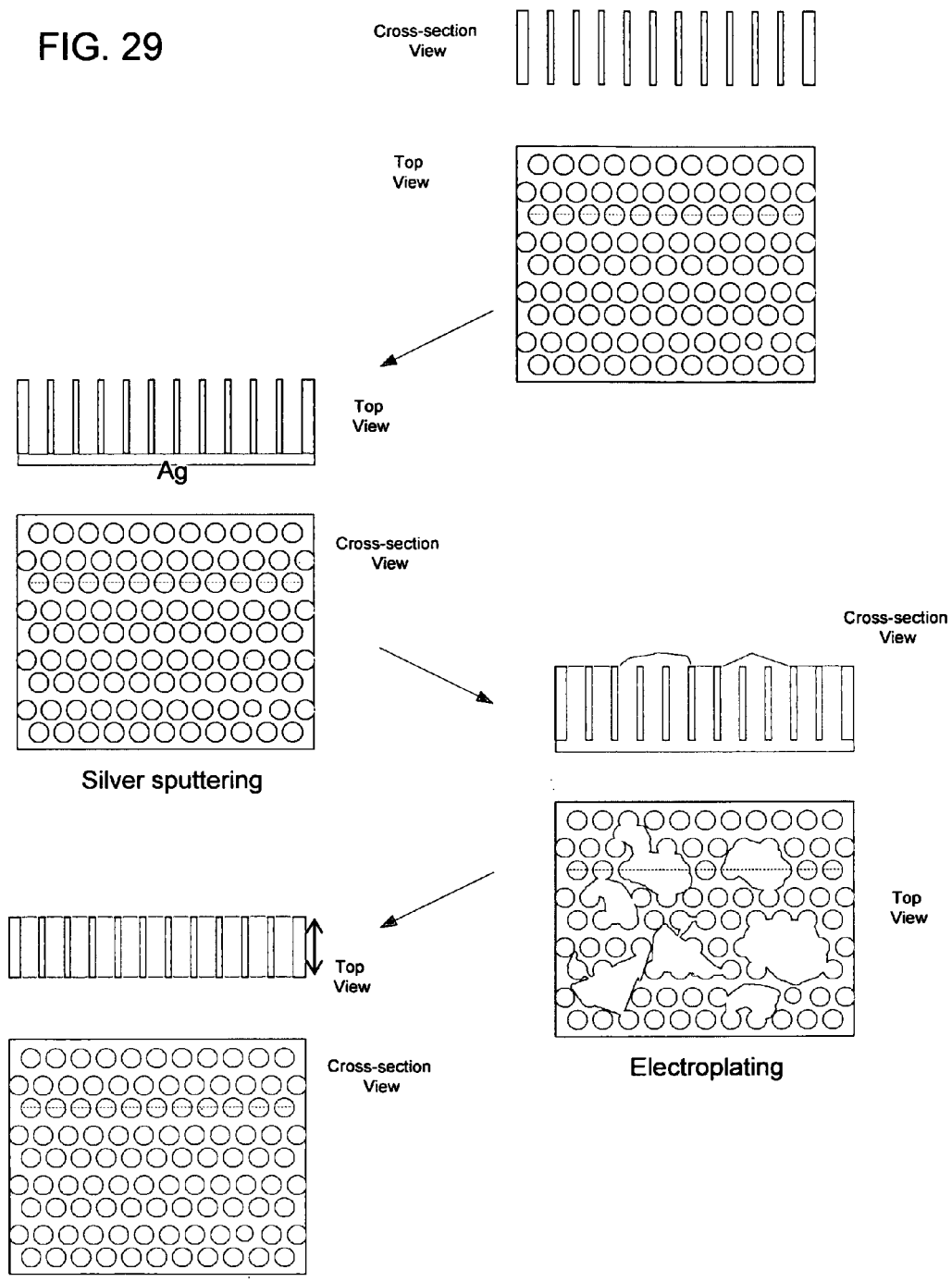
Figure 30A:
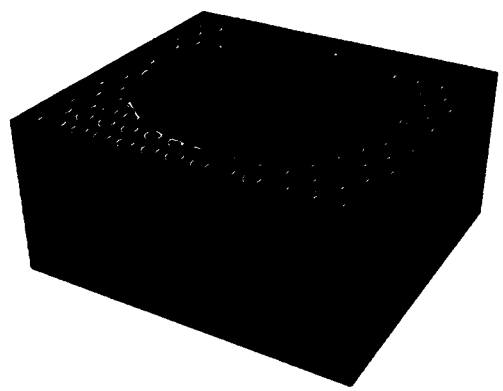
Figure 30B:
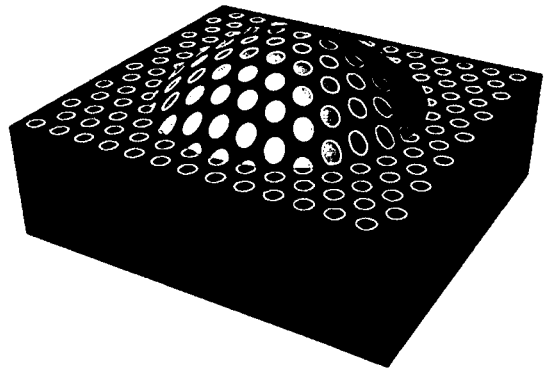

FIG. 29 shows an example of fabrication of 3D nanowire based MIL. A non-metal template with an array of channels, such as an Anodic Aluminium Oxide (AAO) template, is provided and a metal layer, such as a silver layer, is formed on one side of the template (e.g., silver sputtering). Next, electroplating is performed to fill the channels with the same metal (e.g., silver). Double side polishing is performed to remove excessive metal on both sides of the template. As shown in FIGS. 30A and 30B, a shaping process, e.g., a focused ion beam (FIB) shaping, is performed to shape the metal-filled template based on the dispersion and the specific design of the MIL lens.

FIG. 31 shows an example of fabrication of 3D nanowire cylindrical GRIN metalens. First, a metal nanowire is prepared as a "seed" structure and conformal multilayer deposition is performed to deposit alternating metal and non-metal layers over the seed nanowire. The thickness of the deposited, concentric metal and non-metal layers of cylinders can vary from thin at the center to thick at the edge, or the opposite, depending on the dispersion or designing requirements. Next, the structure is cut to the proper height H for the GRIN metalens by, e.g., a FIB cutting process.

Figure 32:
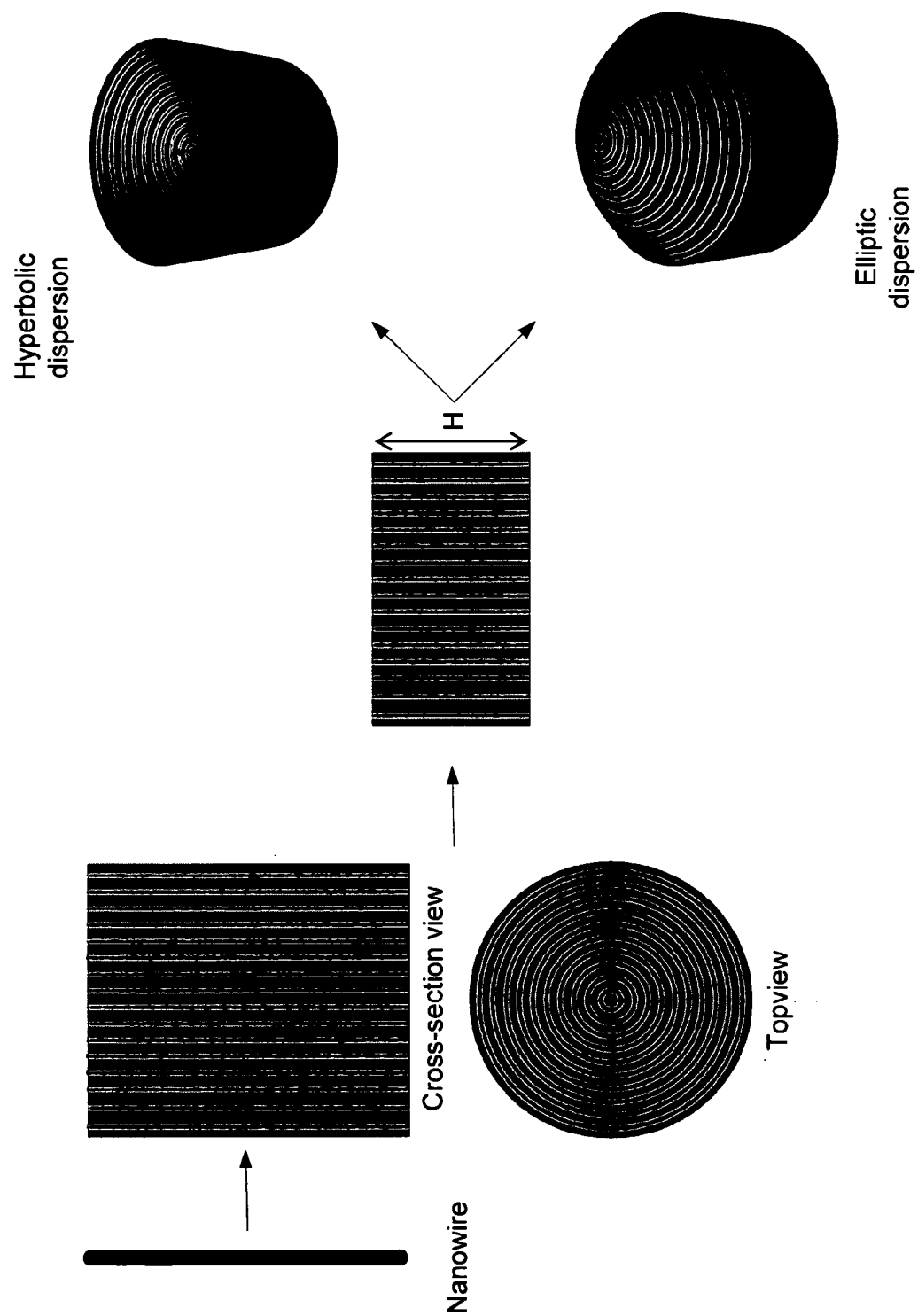

FIG. 32 further shows an example of fabrication of 3D cylindrical multilayer MIL. First, a metal nanowire is prepared as a "seed" structure and conformal multilayer deposition is performed to deposit alternating metal and non-metal layers over the seed nanowire. The thickness of the deposited, concentric metal and non-metal layers of cylinders is controlled to be a constant. Next, the structure is cut to the proper height H for the MIL metalens by, e.g., a FIB cutting process. A shaping process, e.g., a focused ion beam (FIB) shaping, is performed to shape the structure based on the dispersion and the specific design of the MIL lens.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. An optical lens based on an optical metamaterial structure, comprising:
    an optical metamaterial structure comprising nano structures of metallic and dielectric materials; and
    a plasmonic waveguide coupler including a set of insulator layers of varying widths and a set of metal layers, wherein the set of insulator layers and the set of metal layers are spatially interleaved to form a non-periodic structure over the optical metamaterial structure, wherein the optical metamaterial structure and plasmonic waveguide coupler are structured to effect an optical lens;
wherein the optical metamaterial structure includes metallic nanowires and a dielectric template in which the metallic nanowires are embedded.

2. The lens as in claim 1, wherein:
the optical metamaterial structure includes a multilayer composite of metallic and dielectric layers.

3. The lens as in claim 1, wherein:
the metallic nanowires are made of silver and the dielectric template is made of an alumina.

4. The lens as in claim 1, wherein: the optical metamaterial structure includes metallic layers and each metal layer is patterned to include voids.

5. The lens as in claim 1, wherein:
the optical metamaterial structure is an optically anisotropic structure.

6. The lens as in claim 5, wherein:
the plasmonic waveguide coupler includes insulators and metals that are spatially interleaved to form a non-periodic structure that corresponds to the optically anisotropic structure of the optical metamaterial structure in a way that effects the optical lens for performing a Fourier transform in optical imaging.

7. The lens as in claim 6, wherein:
the plasmonic waveguide coupler includes a metal layer that is patterned to have non-periodic channels penetrating through the metal layer to form the insulators.

8. The lens as in claim 5, wherein:
the non-periodic structure of the plasmonic waveguide coupler is structured to produce different phase delays at different locations at an interface with the optical metamaterial structure.

9. The lens as in claim 5, wherein:
the optical metamaterial structure has an applanate elliptic dispersive structure.

10. The lens as in claim 5, wherein:
the optical metamaterial structure has an applanate hyperbolic dispersive structure.

11. The lens as in claim 1, wherein:
the plasmonic waveguide coupler includes a metal layer that is patterned to have non-periodic channels penetrating through the metal layer to form the insulators.

12. The lens as sin claim 11, wherein:
the inner dimensions of the channels vary with location of the channels.

13. An optical lens based on an optical metamaterial structure, comprising:
an optical metamaterial structure comprising nano structures of metallic and dielectric materials; and
a plasmonic waveguide coupler including a set of insulator layers of varying widths and a set of metal layers, wherein the set of insulator layers and the set of metal layers are spatially interleaved to form a non-periodic structure over the optical metamaterial structure, wherein the optical metamaterial structure and plasmonic waveguide coupler are structured to effect an optical lens, wherein:
the optical metamaterial structure includes pairs of metallic nanorods and a dielectric template in which the pairs of metallic nanorods are embedded.

14. An optical lens based on an optical metamaterial structure, comprising:
an optical metamaterial structure including metallic nanowires and a dielectric template in which the metallic nanowires are embedded; and
a plasmonic waveguide coupler formed over the optical metamaterial structure, wherein the optical metamaterial structure and plasmonic waveguide coupler are structured to effect an optical lens for performing a Fourier transform in optical imaging.

15. The lens as in claim 14, wherein:
the optical metamaterial structure includes a multilayer composite of metallic and dielectric layers.

16. The lens as in claim 14, wherein:
the metallic nanowires are made of silver and the dielectric template is made of an alumina.

17. The lens as in claim 14, wherein:
the optical metamaterial structure is an optically anisotropic structure.

18. The lens as in claim 14, wherein:
the plasmonic waveguide coupler includes insulators and metals that are spatially interleaved to form a non-periodic structure.

19. The lens as in claim 18, wherein:
the plasmonic waveguide coupler includes a metal layer that is patterned to have non-periodic channels penetrating through the metal layer to form the insulators.

\* \* \* \* \*